United States Patent [19]
Zuniga

[11] Patent Number: 5,546,474
[45] Date of Patent: Aug. 13, 1996

[54] DETECTION OF PHOTO REGIONS IN DIGITAL IMAGES

[75] Inventor: Oscar A. Zuniga, Fort Collins, Colo.

[73] Assignee: Hewlett-Packard Company, Palo Alto, Calif.

[21] Appl. No.: 171,551

[22] Filed: Dec. 21, 1993

[51] Int. Cl.⁶ ................................................ G06K 9/34
[52] U.S. Cl. ............................................... 382/176
[58] Field of Search ........................ 382/9, 18, 51, 382/48; 358/453, 462

[56] References Cited

U.S. PATENT DOCUMENTS

| | | | |
|---|---|---|---|
| 4,577,235 | 3/1986 | Kannapell et al. | 358/280 |
| 4,668,995 | 5/1987 | Chen et al. | 358/282 |
| 4,817,169 | 3/1989 | Peppers et al. | 382/9 |
| 5,067,163 | 11/1991 | Adachi | 382/6 |
| 5,073,953 | 12/1991 | Westdijk | 382/9 |
| 5,131,049 | 7/1992 | Bloomberg et al. | 382/9 |
| 5,179,599 | 1/1993 | Formanek | 382/51 |
| 5,327,262 | 7/1994 | Williams | 358/462 |

OTHER PUBLICATIONS

Foley, "Systematic Errors . . . ", 1987, pp. 301–313.
Gonzales et al, "Digital Image Processing" Addison–Wesley, 1992, pp. 458–465.

Primary Examiner—Joseph Mancuso
Assistant Examiner—Gerard Del Rosso

[57] ABSTRACT

A method for classifying regions in a digital image as either photo regions or non-photo regions is presented. A digital image is divided into regions and each region is divided into a plurality of cells. Each cell comprises a group of pixels represented by one or more digital bits. Features of a cell such as its graylevel spread, or the moment of inertia of its co-occurrence matrix, are used to determine the likelihood that the cell is a photo cell or a non-photo cell. Based on this likelihood, the cell is classified as either a photo cell, a non-photo cell, or is unclassified. Classified cell is used in conjunction with unclassified cells to grow regions that can be characterized as photo regions or non-photo regions. Once a region is classified as a photo region or a non-photo region a decision is made regarding the number of bits per pixel needed to adequately represent that region.

19 Claims, 21 Drawing Sheets

FIG 4

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 15 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 9 | 0 | 0 |
| 13 | 0 | 0 | 0 | 0 | 0 | 0 | 0 | 0 | 2 | 8 | 29 | 42 | 104 | 29 | 0 | 0 |
| 12 | 0 | 0 | 0 | 0 | 0 | 0 | 0 | 7 | 10 | 9 | 12 | 7 | 0 | 0 | 0 | 0 |
| 11 | 0 | 0 | 0 | 0 | 0 | 0 | 13 | 9 | 9 | 9 | 5 | 0 | 0 | 0 | 0 | 0 |
| 10 | 0 | 0 | 0 | 0 | 0 | 0 | 14 | 13 | 17 | 9 | 5 | 0 | 0 | 0 | 0 | 0 |
| 9 | 0 | 0 | 0 | 0 | 0 | 11 | 37 | 19 | 12 | 4 | 0 | 0 | 0 | 0 | 0 | 0 |
| 8 | 0 | 0 | 0 | 0 | 4 | 33 | 28 | 20 | 4 | 0 | 0 | 0 | 0 | 0 | 0 | 0 |
| 7 | 0 | 0 | 0 | 0 | 13 | 36 | 24 | 10 | 0 | 0 | 0 | 0 | 0 | 0 | 0 | 0 |
| 6 | 0 | 0 | 0 | 0 | 33 | 61 | 25 | 0 | 0 | 0 | 0 | 0 | 0 | 0 | 0 | 0 |
| 5 | 0 | 0 | 0 | 2 | 95 | 72 | 0 | 0 | 0 | 0 | 0 | 0 | 0 | 0 | 0 | 0 |
| 4 | 0 | 0 | 0 | 7 | 103 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |

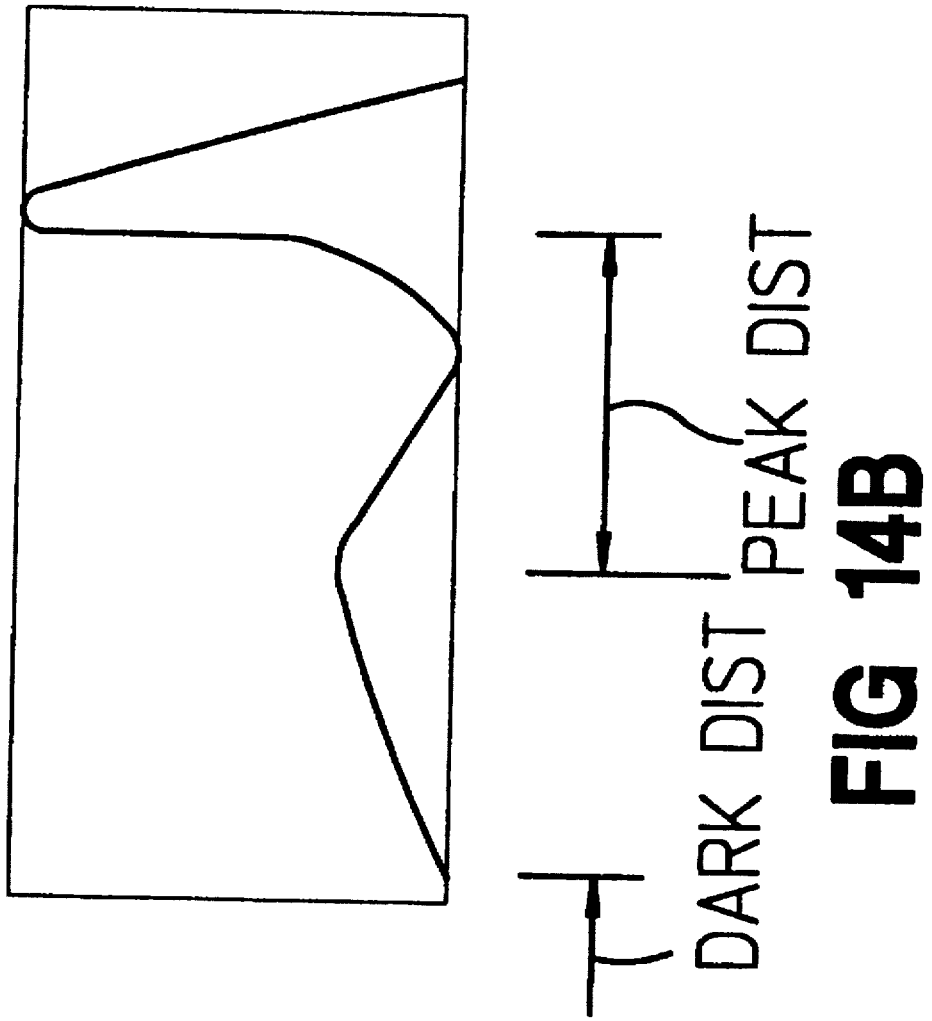

DETECTION OF PHOTO REGIONS IN DIGITAL IMAGES

RELATED APPLICATION

This application is related to a commonly owned application entitled "Automatic Threshold Determination For A Digital Scanner," attorney docket nos. 1093568-1 and 1245.1630000, filed on even date herewith, the full disclosure of which is incorporated herein by reference as if reproduced in full below.

BACKGROUND OF THE INVENTION

1. Field of the Invention

The present invention relates generally to image scanner technology and more specifically to a system and method for detecting photo regions in digital images.

2. Related Art

Digitizing image scanners are often used to digitize documents so they can be manipulated using a computer. For example, a scanner can be used to digitize text and put it into a format recognized by a word processing program so that an editor can rewrite or modify the document.

With advances in processor speed and scanner technology, it has become advantageous to also digitize pictorial images as well as printed text. In an effort to enhance scanner performance, developers have sought ways to optimize the number of bits used to represent a digital image. A simple reduction in the number of bits used to represent an image results in a reduction in image quality. An increase in the number of bits results in greater processor time required to digitize the image and perform subsequent image processing.

To optimize the number of bits used to represent an image, developers have sought to divide a scanned image into regions based on the number of graylevels (and hence the number of bits) required to adequately represent the image. Some regions, such as those containing a pictorial image for example, require a large number of graylevels to adequately represent the image. These regions are termed "photo regions." Other regions, such as those containing plain text or line art, do not require as many graylevels to effectively digitize the image. These regions are referred to as "non-photo regions."

To preserve image resolution, photo regions are represented with multiple number of bits per pixel (e.g., four or more). On the other hand, non-photo regions can typically be represented with one bit per pixel while still capturing the important information. For non photoregions, the one bit used to represent the pixel is set based on whether the graylevel scanned is above or below a specified graylevel threshold. In other words, a threshold graylevel is selected and any pixel darker than the graylevel is set to black and any pixel lighter than the threshold is set to white. If the image is to be printed on a bi-level output device such as a laser printer, then photo regions need to be half toned or even diffused to preserve their quality, whereas non-photo regions can typically be thresholded as discussed above.

Most conventional solutions, such as those used in the "page decomposition" or "page analysis" components of OCR (optical character recognition) products, start with a thresholded image (one bit per pixel) and can discriminate text from graphics. However, these conventional systems cannot give information accurately about the nature of the graphic (i.e., photo, line art).

SUMMARY OF THE INVENTION

The present invention is directed toward a system and method for optimizing the manner in which documents are digitally represented. According to the invention, a digitized document is divided into regions. The regions are classified as photo regions or non-photo regions. Non-photo regions contain simple subject matter such as text or simple line drawings. Photo regions, on the other hand, include more complex images such as pictures. Because of the complexity of the information contained within photo regions, these regions are more appropriately represented with a multiple number of bits per pixel. Non-photo regions, however, can usually be represented with only one bit per pixel. Thus, the number of bits used to represent a digitized document can be optimized by assigning multiple bits per pixel to photo regions and a single bit per pixel to non-photo regions.

Various regions in a document are characterized as either photo regions or non-photo regions. This is accomplished by dividing the digital image into a plurality of cells, wherein each cell includes a group of pixels. Selected cells of the plurality of cells are examined individually to determine whether each cell is likely to be a photo cell (that is part of a photo region), or a non-photo cell (part of a non-photo region). Once the likelihood is determined, the cell is classified as either a photo cell or a non-photo cell. Each cell is then used to grow either a photo region or a non-photo region.

Determination of whether a cell is likely to be a photo cell begins by extracting features from the cell. Numerous features can be extracted which indicate whether the cell is likely to be a photo cell. One of the most important features that can be extracted is a graylevel spread. To determine the graylevel spread, a one-dimensional histogram, referred to as a graylevel histogram, is constructed from the cell. The graylevel histogram indicates the number of pixels at each graylevel in the cell. For example, if the image is represented by sixteen graylevels, the graylevel histogram indicates how many pixels in that cell are at each of the sixteen graylevels.

Once the graylevel histogram is constructed, it is examined to determine which graylevels represent peaks of the histogram and which graylevels represent valleys. A peak is defined by the graylevel for which a local maximum number of pixels exists. For example, a cell having black text printed on a white background will exhibit two peaks: a first peak at a low graylevel for the black or near-black text; and a second peak at a high graylevel for the white or near white. A valley is simply a minimum on the histogram between two peaks.

Once the peaks and valleys are found, a sub-population or mode is determined. A mode is defined by a peak and the two valleys to the left and right of the peak. For each mode, a probability and a spread of the modes is determined. Additionally, an separation indication associated with each mode is determined.

Using a peak, valley and mode information, a graylevel spread of the histogram is determined. The graylevel spread along with other features indicates whether it is likely that the cell is a photo cell or a non-photo cell. For closer and/or broader peaks there will be a larger graylevel spread. This larger graylevel spread indicates a greater likelihood that the cell is a photo-cell. In contrast, a smaller graylevel spread indicating sharp peaks spaced farther apart indicates that the cell is more likely a non-photo cell. This is consistent with the example used above where dark text appears on a light background. In this example, there are two peaks, one for the white background and one for the black text. Because these are sharp peaks separated by almost the full extent of the graylevel spectrum, the graylevel spread for this histogram is small.

Once the likelihood is determined, the cell is classified as either a photo cell or a non-photo cell based on the likelihood. The classified cells are then used as seeds to grow regions as either photo regions or non-photo regions. Non-photo regions are grown from non-photo cells. The regions are grown by locating a highly-likely non-photo cell and combining it with neighboring unclassified cells having similar characteristics. These combined cells are then classified as a non-photo region. Similarly, photo regions are grown starting with a highly-likely photo cell and combining it with neighboring cells that are as of yet unclassified but have similar characteristics.

Other features in addition to the graylevel spread can be used to determine the likelihood that a cell is a photo cell or a non-photo cell. An additional feature that can be used is the moment of inertia of a co-occurrence matrix of the cell. The co-occurrence matrix is a two-dimensional matrix indicating the number of pixels at each graylevel that are adjacent to pixels at another graylevel. Binary regions typically have large black-white transitions. In these regions, the moment of inertia tends to be large. On the other hand, photo regions tend to have smoother graylevel transitions. In these regions, the moment of inertia tends to be small.

Once the regions in the document are classified as photo regions or non-photo regions, the number of bits used to represent the image can be selected for each region. For non-photo regions a simple binary representation is sufficient. In other words, one bit can be used for each pixel. For example, for a region having black text on a white background, a single bit can be used for each pixel to indicate whether that pixel is black or white. For photo regions, more bits can be used to provide additional graylevels between black and white. Obviously, the more bits used to represent each pixel in a photo region yields greater flexibility in reproducing graylevels (or colors) in photo regions. Thus, the number of bits required to represent the digital document is optimized by providing only a number of bits required to adequately represent each data type.

Further features and advantages of the present invention, as well as the structure and operation of various embodiments of the present invention, are described in detail below with reference to the accompanying drawings.

BRIEF DESCRIPTION OF THE DRAWINGS

The present invention will be described with reference to the accompanying drawings. In the drawings, like reference numbers indicate identical or functionally similar elements. Additionally, the left-most digit of a reference number identifies the drawing in which the reference number first appears.

FIG. 4 is a diagram illustrating an example co-occurrence matrix.

FIG. 14B is a diagram illustrating a weak bi-level histogram shape.

DETAILED DESCRIPTION OF THE EMBODIMENTS

Table of Contents 1.0 Overview and Discussion of the Invention
2.0 Feature Extraction
   2.1 Features Used to Determine Photo-regions
      2.1.1 Graylevel Spread
      2.1.2 Alternative or Complementary Feature Extraction
         2.1.2.1 Moment of Inertia of the Co-occurrence Matrix
      2.1.3 Additional Cell Histogram Based Features
         2.1.3.1 Range
         2.1.3.2 Percent-Dark
         2.1.3.3 Histogram Shape
      2.1.4 Other Features
3.0 Determination of Highly Likely Photoregions
3.1 Highly Likely Photo Cells
3.2 Highly Likely Non-Photo Cells
   3.2.1 Background Seeds
3.3 Bilevel Seeds
3.3 Text Seeds
4.0 Region Growing
4.1 Non-photo Region Growing
   4.1.1 Horizonal Left-to-Right
   4.1.2 Horizontal Right-to-Left 4.1.3 Vertical Top-Down
4.1.4 Boundary Guided Region Growing
5.0 Representative Architecture
6.0 Conclusion 1.0 Overview and Discussion of the Invention The present invention is directed toward detecting photo regions in pages scanned by a digitizing scanner and stored in four-bit grayscale. The purpose of detecting photo regions is so that these regions can be processed differently from non-photo regions. In most cases, photo regions need to be handled differently from non-photo regions to preserve information contained therein. For example, non-photo regions, such as line art or text can be represented accurately by thresholding the grayscale with a suitable fixed or variable local threshold. On the other hand, photo regions can be half-toned in order to render them accurately. Likewise, data compression techniques that are effective with line art or text data are not suitable for use with photo data where special techniques must be used.

The method disclosed herein is applicable in areas such as OCR (as part of page decomposition), imaging (e.g., automatic detection of "photo" types from within a page for user selection and editing), and Document Management (processing quality and efficient storage, by keeping and compressing grayscale when needed).

In a preferred embodiment, the method of the present invention can be broken down into three primary steps:

Step 104—Feature extraction;
Step 108—Determination of initial highly likely photo cells and non-photo cells; and
Step 112—Region growing based on similarity measures and local context.

Figure 1:
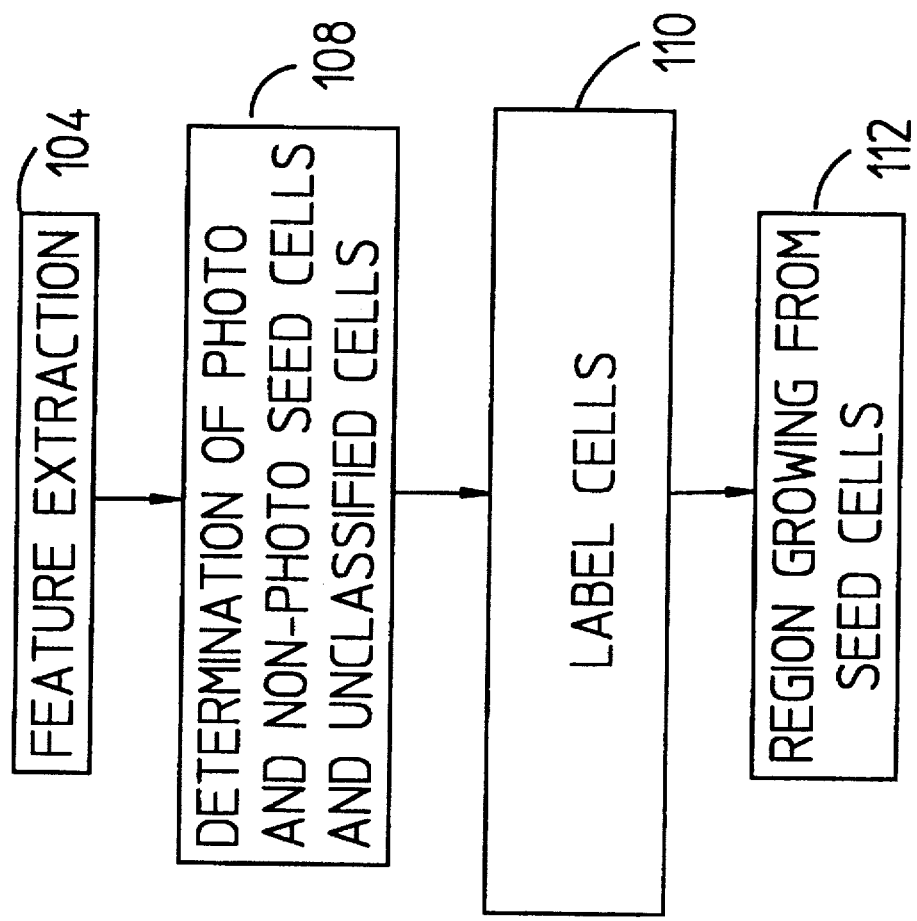
FIG. 1 is a high level operational flow diagram illustrating the manner in which regions of a document are classified as photo regions or non-photo regions.

These three steps are illustrated in FIG. 1. Each step is described in detail in the sections that follow. Specifically, Step 104 is discussed in Section 2.0, Step 108 is discussed in Section 3.0, and step 112 is discussed in Section 4.0.

These steps are applied to a digital image. The digital image is an image of a document (e.g. a page) that can comprise any or all of the following: text, line graphics, and photo or photo-like regions. The image may be in digital format as a result of scanning using a digitizing scanner or creation using a desktop publishing system.

2.0 Feature Extraction

In a preferred embodiment, the digital image is divided into cells (described below). Features are extracted for all cells to determine the likelihood of each cell being a photo cell—i.e. having characteristics of a photo-region.

All cells are labeled as either photo cells, non-photo cells, or are unclassified. Classified cells (i.e., photo and non-photo cells) are used as seeds from which unclassified cells are "grown."

The Step 104 of feature extraction is now described. In step 104, features, which may indicate the likelihood that various regions in a scanned document are photo-regions, are extracted from the scanned document. The features can include, but are not limited to, the graylevel spread, the moment of inertia of a co-occurrence matrix, and row and column profiles.

Figure 5:
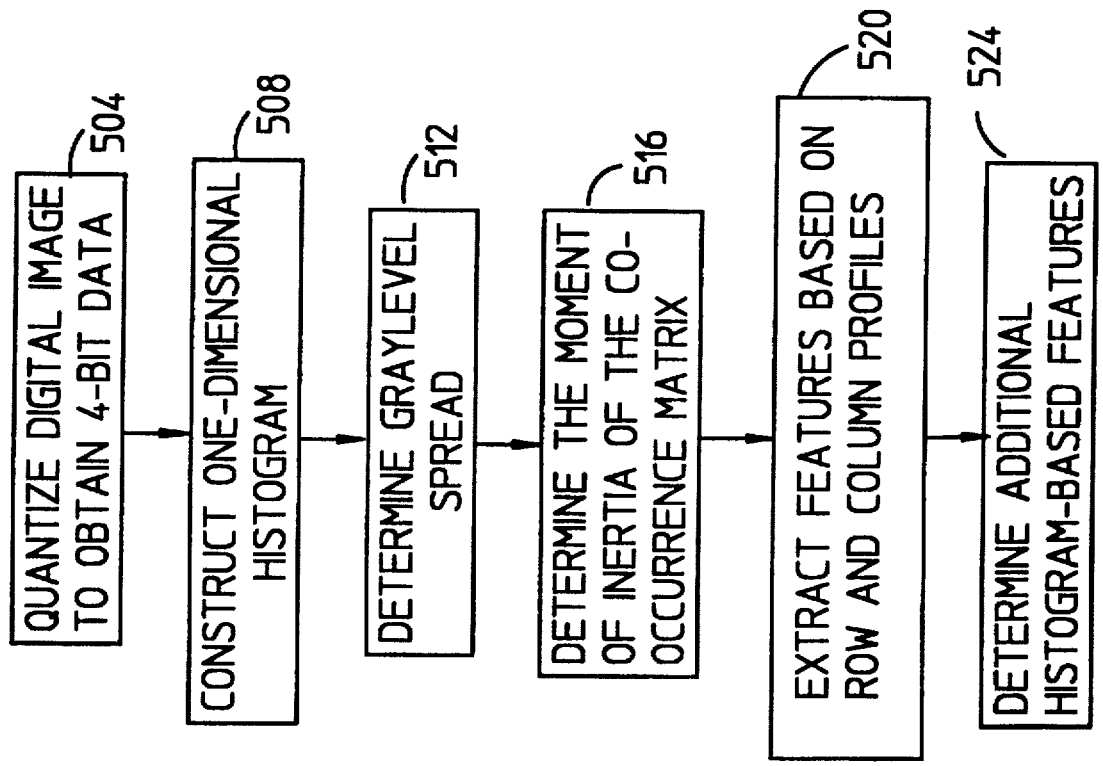
FIG. 5 is an operational flow diagram illustrating the manner in which features are extracted for a cell.

FIG. 5 is an operational flow diagram illustrating the manner in which features are extracted in a preferred embodiment. Referring now to FIG. 5, in this embodiment, features are extracted for all cells of a scanned document. For a 300 dpi scanned page, a cell area of 64×64 pixels may be selected. This equates to approximately ⅕"×⅕". This format is selected to match the size of cells used in the autointensity algorithm of the Hewlett Packard Company's Accupage™ Scanners. It would be apparent to a person skilled in the relevant art how other formats could be implemented with the invention described herein.

The preferred embodiment uses data in a four-bit grayscale. This is done to minimize data transfer time from a scanner to a host computer while still retaining enough information to detect photo regions and preserve them with reasonable quality. For scanners using 8-bit tone mapping (256 colors or shades of gray), a conversion must be made from the 8-bit format to the four-bit format.

In a step 504, the four-bit data is obtained by non-uniformly quantizing the original eight-bit data. To most effectively match human eye response, the conversion involves an eight-bit to four-bit tone mapping that spaces the brighter levels more widely than the darker levels. This is essentially a conversion from eight-bit reflectance data to four-bit "lightness" data L* (as used in the L* a b color space). L*ab is a color space that is one of many standards known in the industry. L*ab is not typically used as it is used in this case to quantize 8 bit grayscale data into 4 bit. This tone-mapping is given in Table 1, below.

TABLE 1

| 8-bit reflectance | 4-bit L* |
| --- | --- |
| 0–63 (white) | 15 (white) |
| 64–92 | 14 |
| 93–119 | 13 |
| 120–142 | 12 |
| 143–163 | 11 |
| 164–180 | 10 |
| 181–196 | 9 |
| 197–209 | 8 |
| 210–220 | 7 |
| 221–229 | 6 |
| 230–236 | 5 |
| 237–242 | 4 |
| 243–246 | 3 |
| 247–249 | 2 |
| 250–251 | 1 |
| 252–255 (black) | 0 (black) |

In a step 508, a one-dimensional histogram is constructed for the scanned cell. The histogram indicates the number of pixels in the cell that are in each gray level. For example, if 238 pixels in the cell are at a graylevel 12, the 12th element of the histogram is assigned the value of 238. The histogram could be easily constructed by looking at each pixel individually and incrementing the element of the histogram that corresponds to that graylevel. The one-dimensional histogram constructed in step 508 is called a "graylevel histogram" because it indicates the number of pixels in the cell at each graylevel.

2.1 Features Used to Determine Photo-regions 2.1.1 Graylevel Spread

Non-photo regions typically show two widely separated, narrow concentrations of graylevels. For example, text appears in a histogram as two peaks, a foreground peak and a background peak. Most of the data is narrowly spread about each peak. A very uniform background such as a white or colored page appears as a single peak with gray narrowly spread about it. Similarly, dark, sharply defined text appears as a single peak as well.

On the other hand, a photo region appears as a wide spread of graylevels about one or more peaks. Therefore, the graylevel spread is a good indication of whether a cell resides in a photo region or a non-photo region. The graylevel spread is determined in a step 512.

Figure 6:
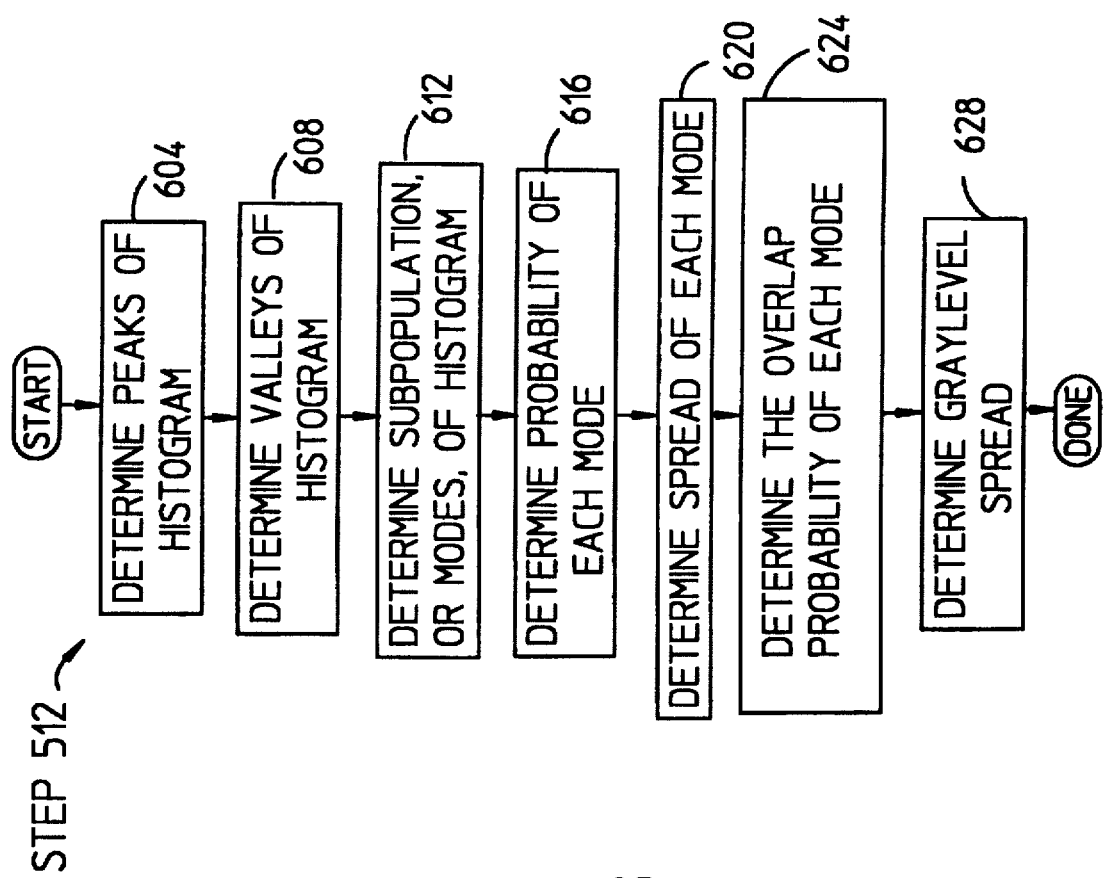
FIG. 6 is an operational flow diagram illustrating the manner in which the graylevel spread of a cell is determined.

FIG. 6 is an operational flow diagram illustrating the manner in which the graylevel spread is determined according to a preferred embodiment. Referring now to FIG. 6, in a step 604, the peaks of the histogram are determined. The histogram of the graylevels in the cell can be defined as follows:

$$histo[K], K=0, \ldots, 15$$

The peaks can be defined as follows:
K is a peak ($0 \leq K > 15$) if two conditions are met:

$$histo[K-1] < histo[K] > histo[K+1]; \quad \text{(i)}$$

and $$2histo[K] - histo[K-1] - histo[K+1] > histo[K]/10 \quad \text{(ii)}$$

Alternatively, K is a peak if the following two conditions are met:

$$histo[K-1] < histo[K] > histo[K+2]; \quad \text{(i)}$$

where $$histo[K] = histo[K+1];$$

and $$2histo[k] - histo[K-1] - histo[K+2] > histo[K]/10. \quad \text{(ii)}$$

This definition allows for the existence of a "flat" peak of width=2 bins of the histogram. To take into account effects at the edges of the histogram, the end values of the histogram are defined as $$histo[-1]=0;$$

and $$histo[16]=histo[17]=0.$$

In a step 608, the valleys of the histogram are determined. A valley is defined as the minimum graylevel value between two peaks. In other words, if the graylevels $P_1$ and $P_2$ are consecutive peaks, then, $V_1$, for $P_1 < V_1 < P_2$, is a valley if:

$$histo[V_1] \leq histo[i], \text{ for all } i,$$

where $$P_1 \leq i \leq P_2$$

In a step 612, subpopulations or modes of the histogram, are found. A mode is defined by a peak and each of the two valleys to its left and its right. The peak can be written as peak[K]. The two valleys can be written as val[K] and val[K+1] for the left and right valleys respectively. Using this terminology, mode K is defined as the area under the histogram from val[K] to val [K+1].

Figure 7:
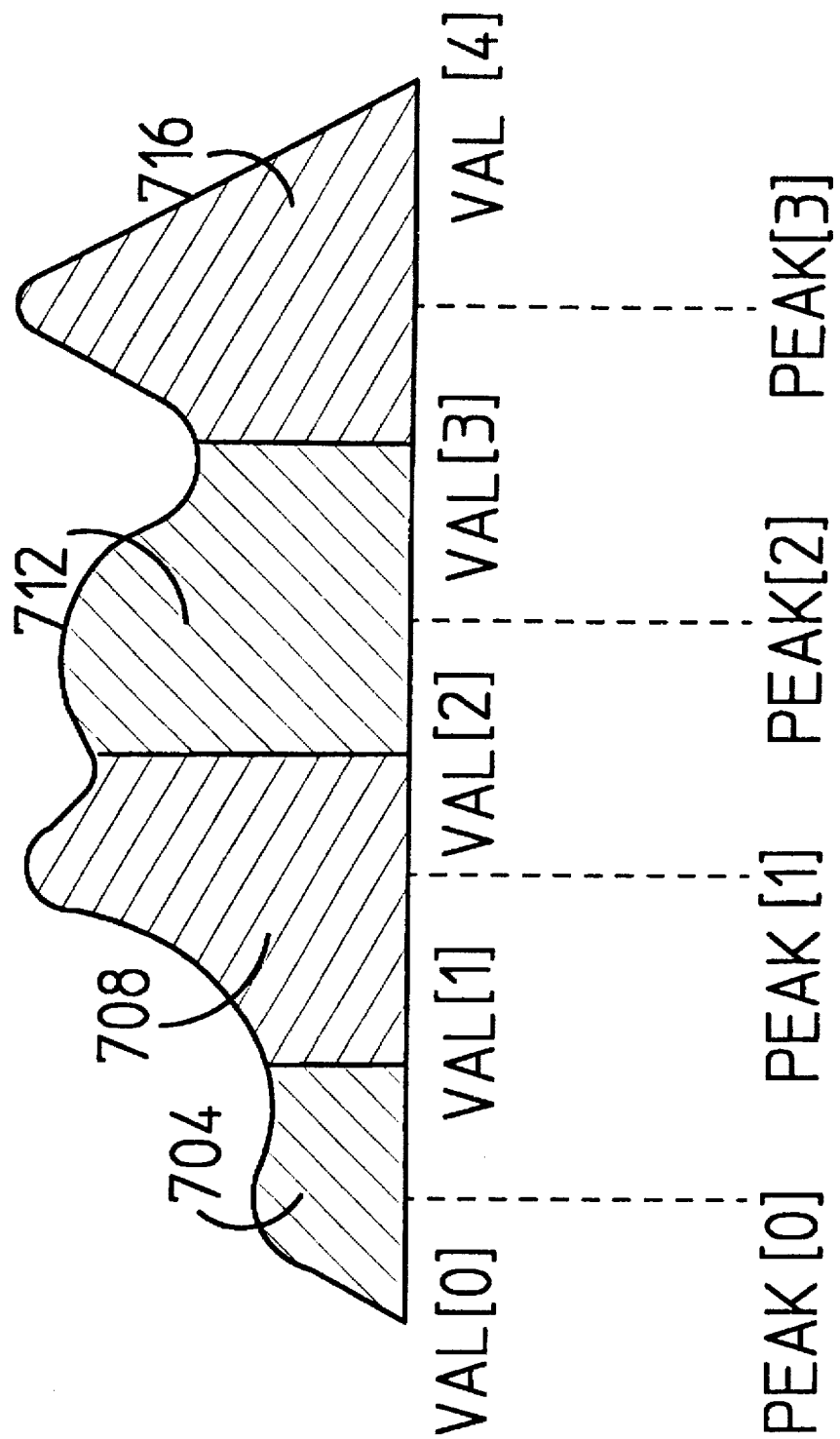
FIG. 7 is a diagram illustrating the sub-population or modes of a graylevel histogram.

FIG. 7 is a diagram illustrating the manner in which the modes are found for an example histogram. Referring now to FIG. 7, in this example, there are four modes 704, 708, 712, and 716. Each is defined by a peak and its two surrounding valleys. Note that the first and last valleys for the histogram, val[0] and val[4], respectively, are defined such that:

$$hist[val[0]]=hist[val[4]]=0$$

In a step 616, the probability of each mode is found. The probability of each mode is given $$p(K) = \frac{0.5\ histo[val[K]] + \sum_{i=val[K]+1}^{val[K+1]-1} histo[i] + 0.5\ histo[val[K+1]]}{\sum_{i=0}^{15} histo[i]}$$

Figure 8:
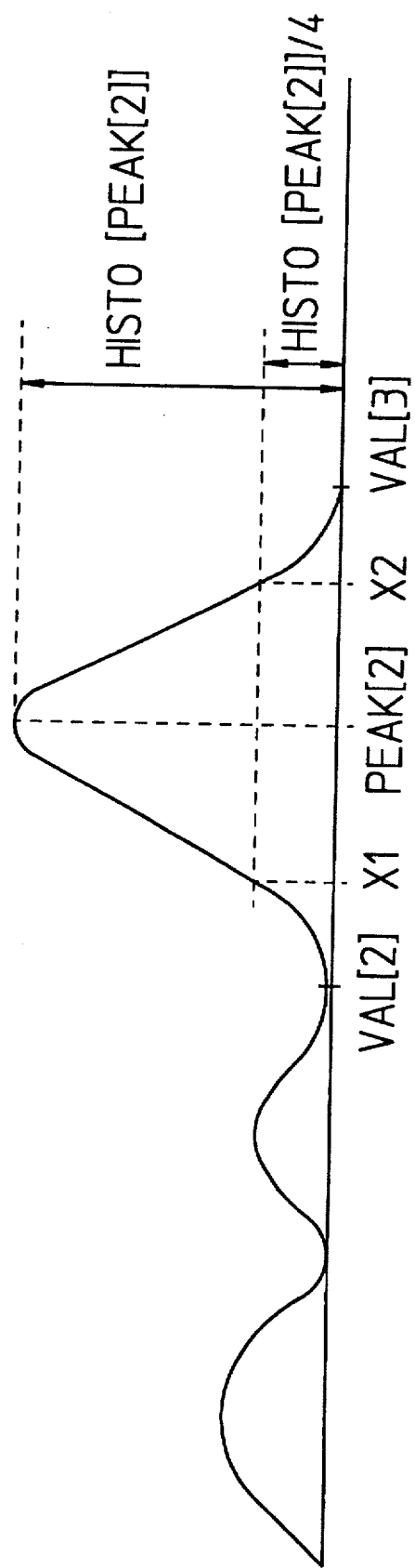
FIG. 8 is a diagram illustrating the spread of a sub-population or mode.

In a step 620, the spread of each mode is determined. To define the spread, the mode is measured from the peak, out to the points where it is one-fourth the value of the peak. FIG. 8 is a diagram illustrating an example of the spread of a node. Referring now to FIG. 8, the node has two values X1 and X2 to the left and to the right of the peak, respectively.

X1 defines the left bound of the node spread and X2 defines the right bound of the node spread. X1, which lies between the left valley and the peak (i.e., val[2] $\leq$ X1 $\leq$ peak [2]), is given by:

$$histo[X] \geq histo[peak[2]]/4$$

$$X1 \leq X \leq peak[2]; \quad \text{(i)}$$

and $$histo[X] < histo[peak[2]]/4$$

$$val[2] \leq X < X1 \quad \text{(ii)}$$

If (ii) cannot be satisfied because $$histo[val[2]] \geq histo[peak[2]]/4,$$

then X1 is set to equal val[2].

Similarly, X2, which lies between the peak and the valley to the right (i.e., peak[2] $\leq$ X2 $\leq$ val[3]) is given by:

$$histo[X] \geq histo[peak[2]]/4$$

$$peak[2] \leq X \leq X2 \quad \text{(i)}$$

$$histo[X] < histo[peak[2]]/4$$

$$X2 < X < val[3] \quad \text{(ii)}$$

Similarly, if (ii) cannot be satisfied because $$histo[val[3]] > histo[peak[2]],$$

then X2 is set equal to val[3].

Using these endpoints, the spread of the mode corresponding to peak[2] is defined as:

$$sd[2] = X2 - X1 + 1.$$

Figure 9:
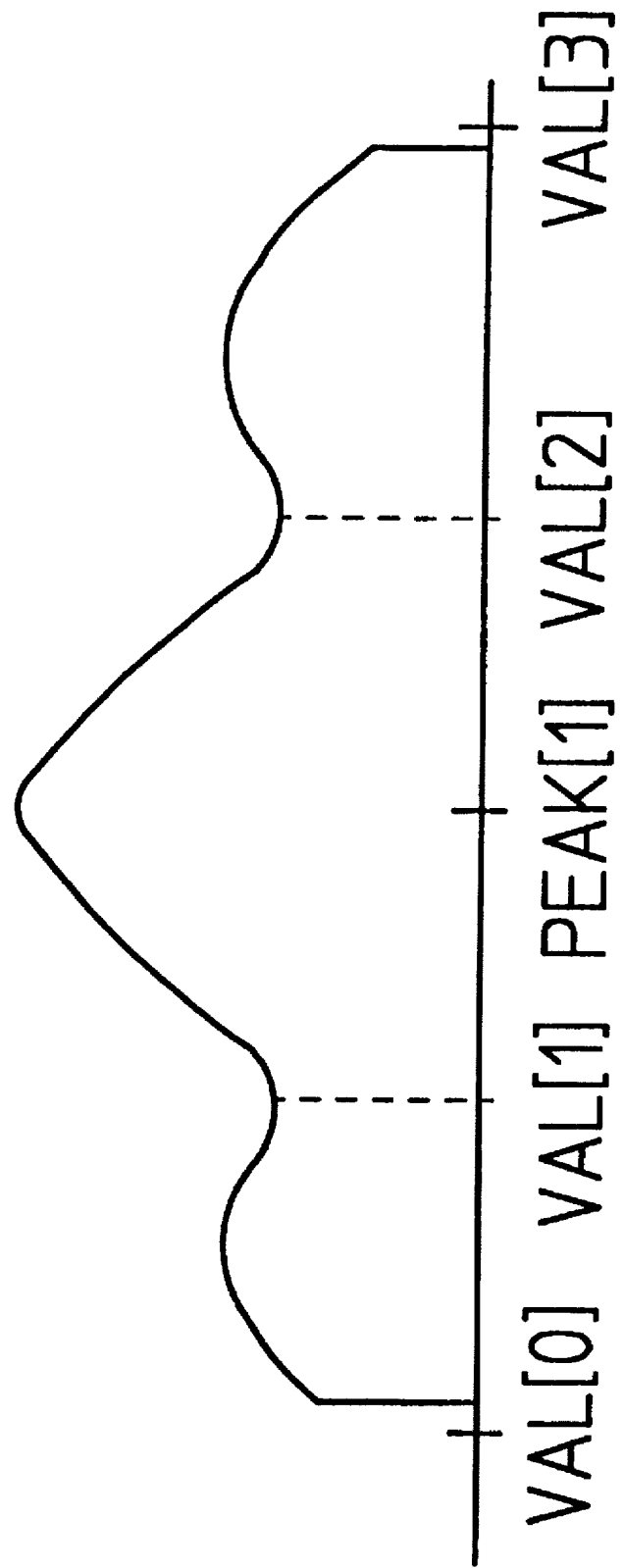
FIG. 9 is a diagram illustrating the separation indication of sub-population or mode.

In a step 624, the "separation indication" associated with each mode is defined. FIG. 9 illustrates the of a node. Referring now to FIG. 9 The separation indication pov[i], associated with a peak[i], is defined as $$pov[i] = \frac{histo[val[i]] + histo[val[i+1]]}{2 \max_i \{histo[i]\}}$$

Figure 10A:
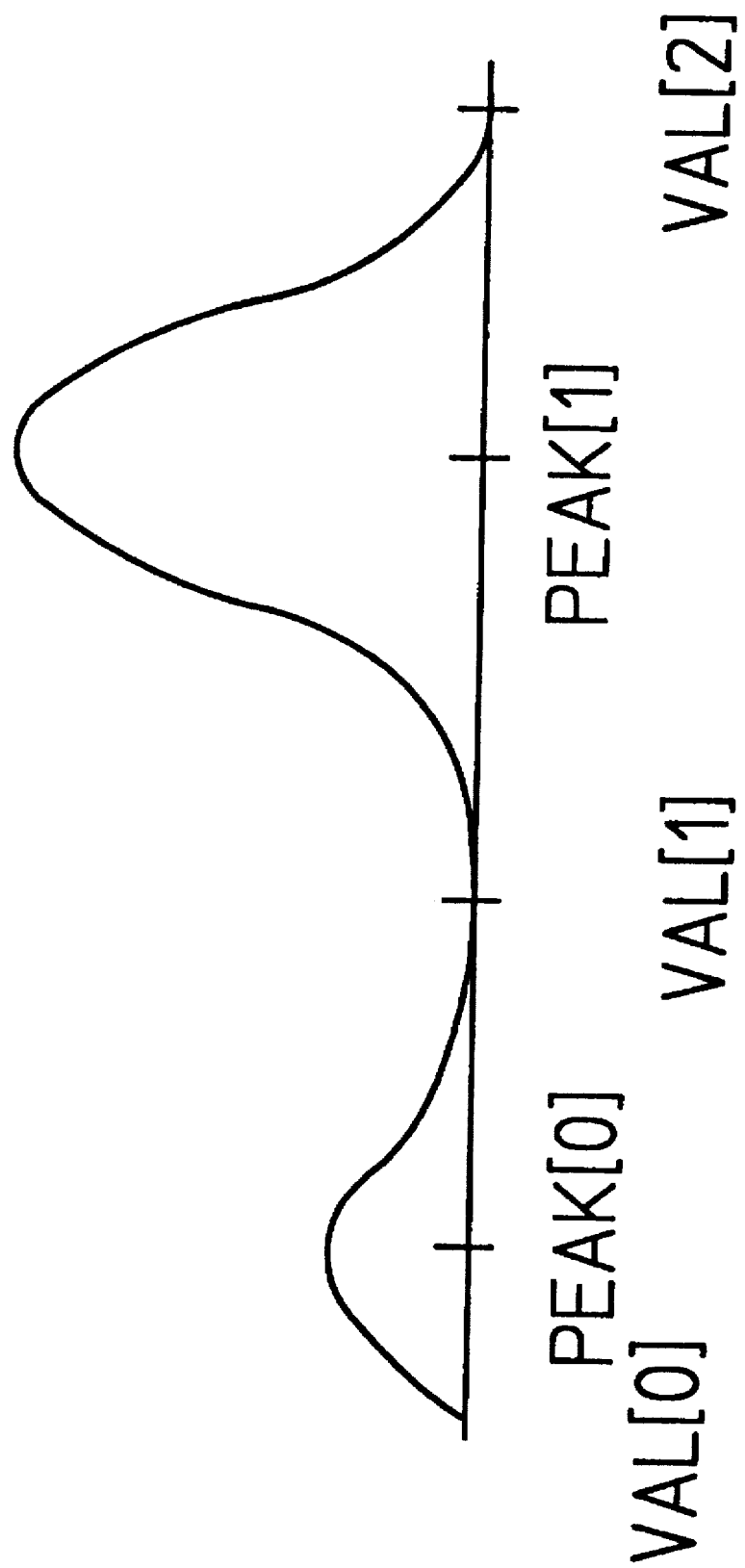
FIG. 10A is a diagram illustrating an example where separation indication for each mode is zero.
Figure 10B:
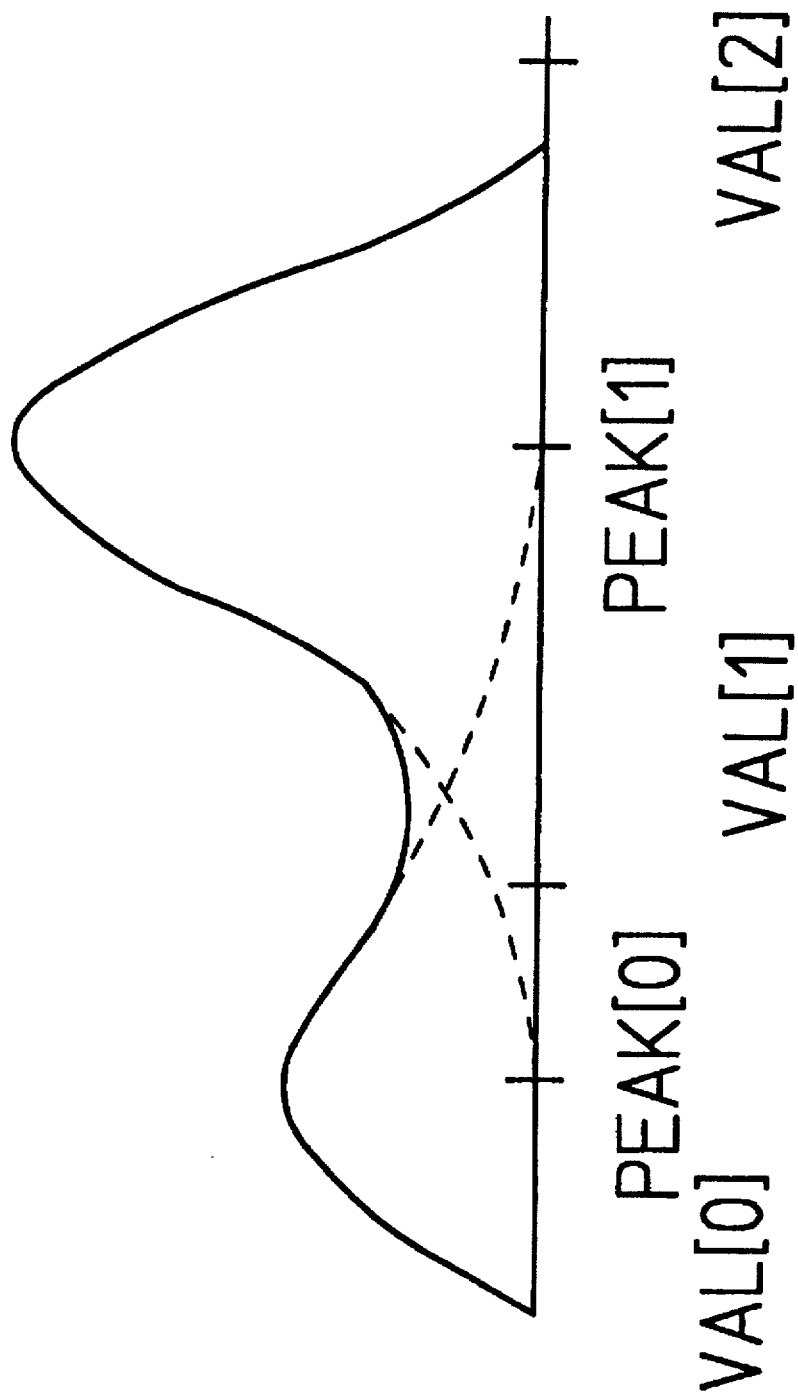
FIG. 10B is a diagram illustrating an example where modes overlap.

Notice that the separation indication provides a measure of the separation between subpopulations or modes. FIGS. 10A and 10B illustrate how the separation indication indicates the separation. Referring now to FIGS. 10A and 10B, the separation indication for each node in the example histogram shown in FIG. 10A has a histogram value of zero.

On the other hand, the separation indication for each mode in the histogram shown in FIG. 10B is not zero. The dashed lines in FIG. 10B illustrate how the modes may overlap.

In a step 628, the graylevel spread of the histogram is determined. The graylevel spread $G_s$ is given by:

$$G_s = \sum_i sd[i](p[i] + pov[i])$$

where sd[t] is the spread of the mode i, p[i] is the probability of mode i, and pov[t] is the separation indication of overlap of mode i.

A few examples are presented to illustrate the graylevel spread for histograms. The examples provided are chosen to illustrate the effect of the overlap probability on the graylevel spread.

EXAMPLE 1

Figure 11:
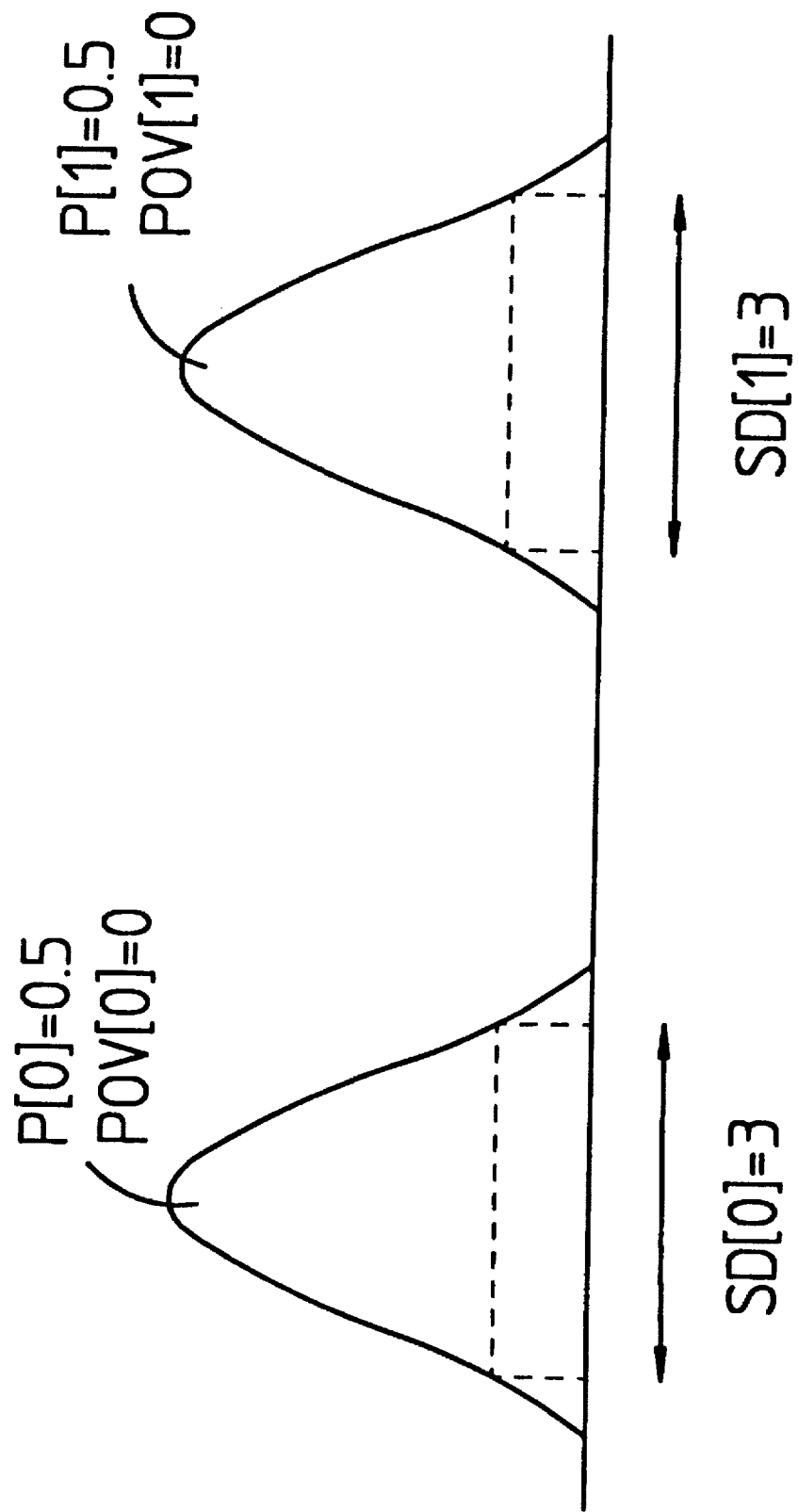
FIG. 11 is a diagram illustrating an example where the graylevel spread indicates two distinct graylevel peaks.

FIG. 11 illustrates one example of the graylevel spread determination for a histogram. Referring now to FIG. 11, and plugging the values into the above-defined equation for $G_s$ yields:

$$G_s = 3(0.5+0) + 3(0.5+0) = 3$$

EXAMPLE 2

Figure 12:
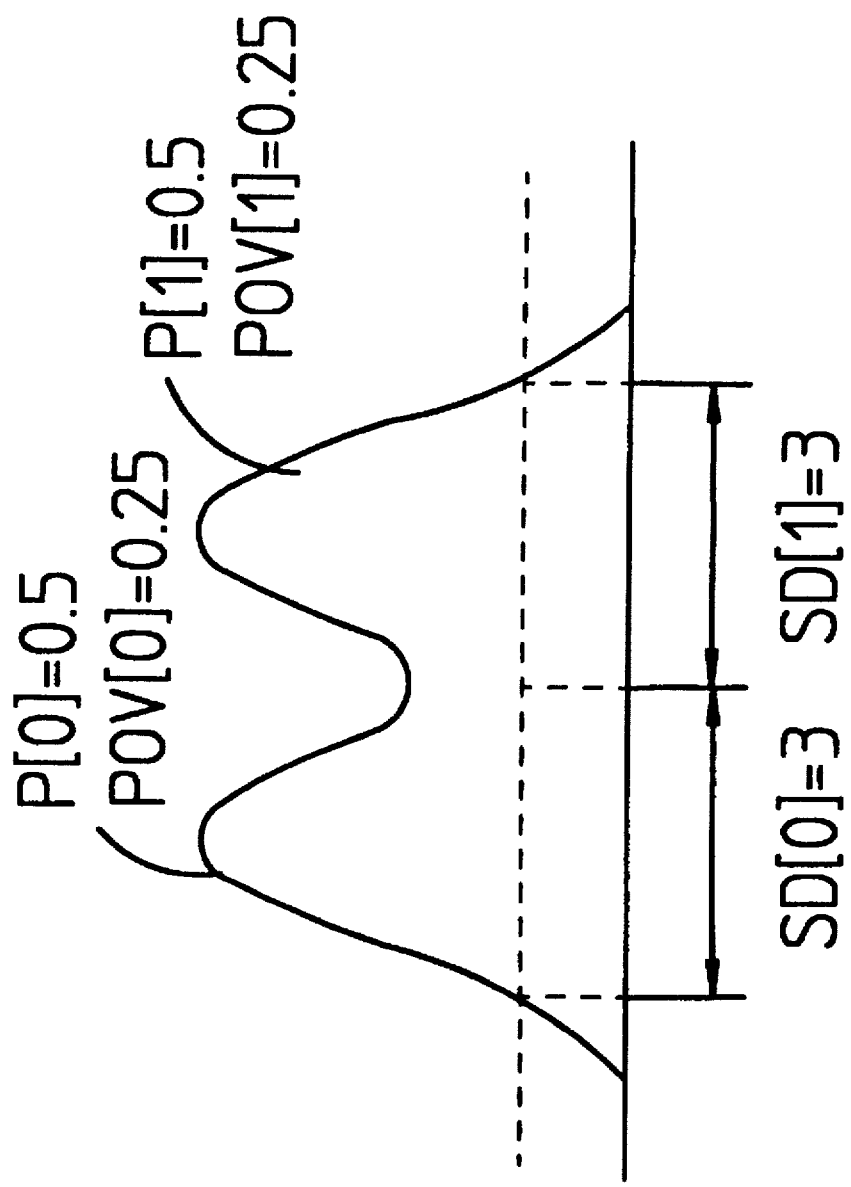
FIG. 12 is a diagram illustrating an example where the graylevel spread indicates that the peaks are closer together and broader.

FIG. 12 illustrates a second example of the graylevel spread determination for a histogram. Referring now to FIG. 12, and plugging the values into the above-defined equation for $G_s$ yields:

$$G_s = 3(0.5+0.25) + 3(0.5+0.25) = 4.5$$

Notice that without the separation indication term, Example 1 and Example 2 would have exactly the same graylevel spread. But, because the peaks of the histogram in level 2 are closer and/or broader, they have a larger graylevel spread. A larger graylevel spread for Example 2 (i.e., more "photo"-like) is consistent with the visual perception which is common with this data.

The graylevel spread feature just described is based on the cell histogram. Thus, the graylevel spread can be defined for each cell scanned in a document. There are additional features of a scanned, digitized document which can also be extracted. Some of these are also based on the cell histogram. Of the cell histogram based features, the graylevel spread is perhaps the most important. The graylevel spread is a primary feature used to discriminate between binary (two color—e.g. text and line drawings) and contone (i.e. photo-like) images.

2.1.2 Alternative or Complementary Feature Extraction

The graylevel spread feature described above is based on the cell histogram. There are many additional features that are not based on the cell histogram. A few of these are now described. These features can be extracted in place of or in addition to the graylevel spread.

2.1.2.1 Moment of Inertia of the Co-occurrence Matrix

A first feature, not based on the cell histogram, is the moment of inertia of a co-occurrence matrix of the cell about a diagonal. The optional step of extracting the moment of inertia feature occurs in a step 516. To determine the moment of inertia of a co-occurrence matrix, a co-occurrence matrix is constructed for each cell of the page. As introduced above, a cell is a pre-defined portion of a scanned document. The size of a cell can vary and is chosen by making a performance/quality tradeoff. If the cell size is designated as smaller (corresponding to a greater number of cells per page), more threshold determinations can be made for each page. This designation may be beneficial where the page contrast is not uniform over the page area.

Figure 2:
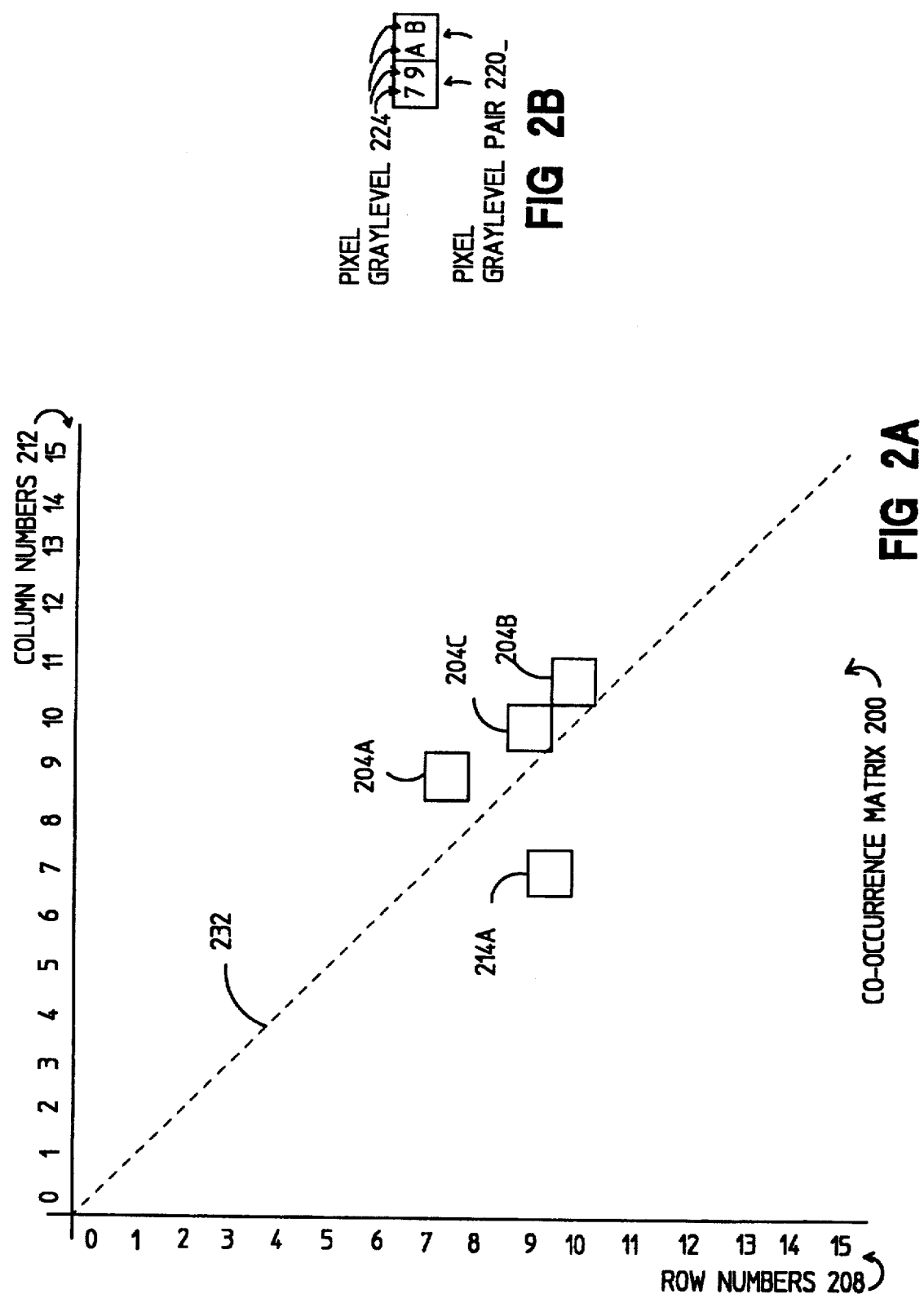
FIG. 2A is a diagram illustrating the structure of a co-occurrence matrix.
FIG. 2B is a diagram illustrating pixel graylevel pairs.
Figure 3:
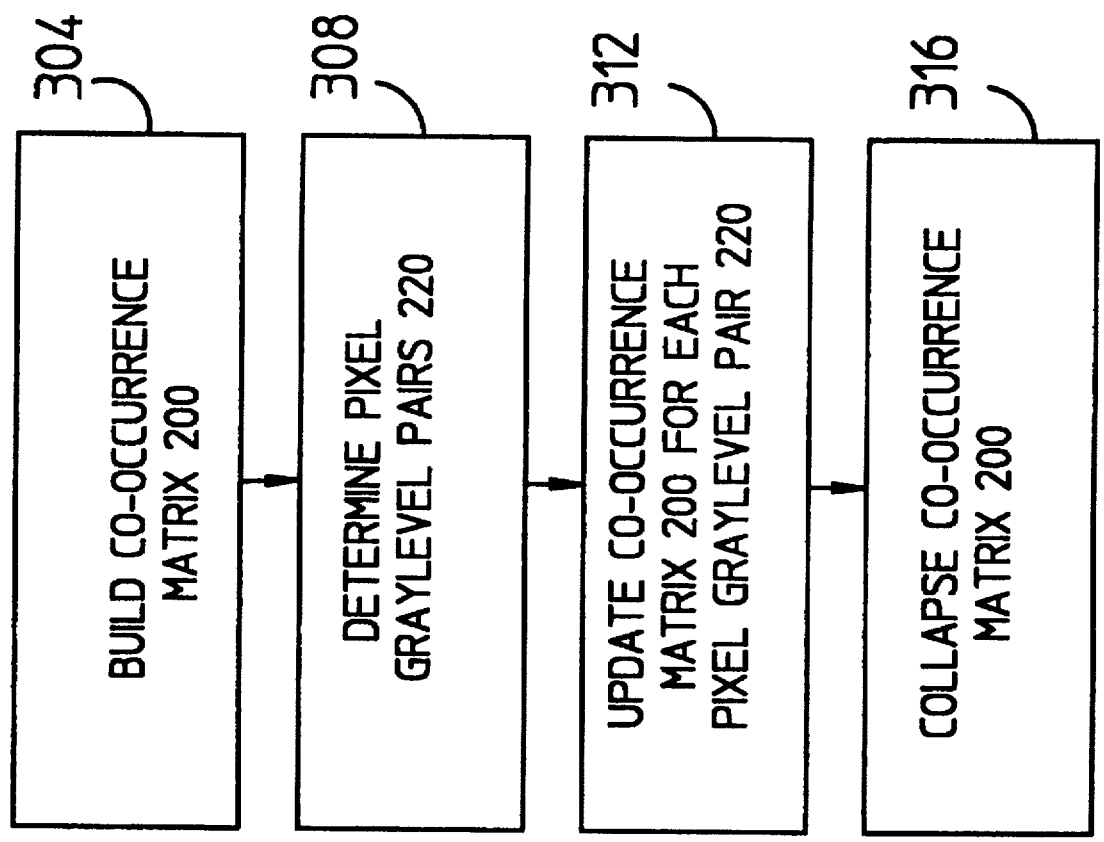
FIG. 3 is an operational flow diagram illustrating the manner in which a co-occurrence matrix is constructed.

The co-occurrence matrix and how it is constructed is now described in greater detail. FIG. 2A is a diagram illustrating the framework of a co-occurrence matrix. FIG. 2b is a diagram illustrating the manner in which the graylevel value for each pixel is paired for use in constructing the co-occurrence matrix. FIG. 3 is an operational flow diagram illustrating the steps involved in constructing the co-occurrence matrix.

Referring now to FIG. 3, in a step 304, a co-occurrence matrix is constructed (or retrieved from memory). Referring now to FIG. 2A, a co-occurrence matrix 200 is a matrix having a number of rows and a number of columns equal to the number of graylevels. Thus, for a system using 4-bits per pixel, co-occurrence matrix 200 is a symmetrical 16×16 matrix. Each row is identified by a row number 208 and each column is identified by a column number 212.

At the intersection of each row and column is an element 204 of co-occurrence matrix 200. For example, three elements 204 are highlighted in FIG. 2A: at the intersection of row 7 and column 9 is element 204A; at the intersection of row 9 and column 10 is element 204C; and at the intersection of row 10 and column 11 is element 204B. These elements can also be referred to by their coordinates: for example, (7,9), (9,10), and (10,11), respectively.

The co-occurrence matrix 200 constructed at this step 304 is an empty matrix having an initial value (such as zero (0)) at each element 204.

In a step 308, pixel graylevel pairs are determined. Referring now to FIG. 2B, when the document is scanned, the resultant pixel pattern can be paired into a pair of adjacent pixel graylevel values 224 referred to as a pixel graylevel pair 220. This pair indicates that a pixel of a first graylevel value 224 is adjacent to a pixel having a second graylevel value 224. In the example illustrated in FIG. 2B, two pixel graylevel pairs are illustrated. A first pair 220 indicates that a pixel with a graylevel 224 of 7 is next to a pixel having a graylevel 224 of 9, A second pair indicates that a pixel with a graylevel 224 of 10 (represented by hexadecimal A) is next to a pixel having a graylevel 224 of 11 (represented by hexadecimal B).

Grouping of pixel graylevels 224 into pairs as illustrated in FIG. 2B describes only one possible embodiment of the invention. Additional and/or alternative groupings could be implemented. For example, an additional pair 220 could be defined using the pixel having a graylevel 224 of 9 and the pixel having a graylevel 224 of HEX A. The inventor has determined that, for many applications, the marginal increase in scanned quality obtained by including this additional pair may not warrant the additional processing time required in subsequent steps to handle such an increase in the number of pairs 220.

In a step 312, the co-occurrence matrix 200 is updated using the pixel graylevel pairs 220 determined in step 308. The manner in which this is accomplished is now described. As described above, each pixel graylevel pair 220 indicates that a pixel having a graylevel value 224 is adjacent to another pixel value 224. Note that these two graylevels 224 that make up the pair 220 can be the same—that is adjacent pixels can have the same graylevel 224. For the example illustrated in FIG. 2B, one pair 220 indicates that a pixel having a graylevel 224 of 7 is next to a pixel having a graylevel 224 of 9. For this pair 220 of 7 and 9, element 204A (i.e. element (7,9)) of co-occurrence matrix 200 is incremented. Similarly, for each graylevel pair 220 (e.g. X and Y), the element 204 corresponding to the intersection of row X, column Y (e.g. element (X,Y)) is incremented.

Thus, each element 204 for each X,Y intersection contains a number indicating the number of times a pixel having a graylevel 224 of X is adjacent to a pixel having a graylevel 224 of Y.

Because the pair 220 indicates adjacent graylevels, a pair given by (X, Y) is the same as pair (Y,X). For example, a graylevel 224 of 7 next to a graylevel 224 of 9 is the same as a graylevel 224 of 9 next to a graylevel 224 of 7. Therefore, in a step 316 co-occurrence matrix 200 is collapsed such that only elements 204 on and above the main diagonal (represented by dashed line 232) of co-occurrence matrix 200 are incremented. For example, for the pairs (7,9) and (9,7), element 204A is incremented and an element 214 is not incremented. Thus, only data in elements 204 on and above the main diagonal need to be processed.

An example of a co-occurrence matrix 200 with data from a cell inserted therein is illustrated in FIG. 4. Referring now to FIG. 4, in this example there are seven (7) occurrences of a pixel with a graylevel of three (3) next to a pixel with a graylevel of four (4), two (2) occurrences of a pixel with a graylevel of three (3) next to a pixel with a graylevel of five (5), one-hundred and three (103) occurrences of a pixel with a graylevel of four (4) next to a pixel with a graylevel of four (4), ninety-five (95) occurrences of a pixel with a graylevel of five (5) next to a pixel with a graylevel of four (4), and so on. As FIG. 4 illustrates, data is only entered in elements 204 on and above the main diagonal of the matrix 200.

In summary, each element 204 of the co-occurrence matrix 200 is defined as the number of occurrences of gray value i next to gray value j. The moment if inertia, $M_1$ about the diagonal of co-occurrence matrix 200 is defined as: where $C_{ij}$ is the element of the co-occurrence matrix at row i and column j.

$$M_I = \frac{\sum_i \sum_j (i-j)^2 C_{ij}}{\sum_i \sum_j C_{ij}}$$

An alternative, computationally similar definition is given by:

$$M_I^* = \frac{\sum_i \sum_j |i-j| C_{ij}}{\sum_i \sum_j C_{ij}}$$

Binary regions typically have large black-white transitions, therefore, in these regions, $M_1$ tends to be large. On the other hand, contone regions tend to have smoother gray level transitions, therefore, in these regions, $M_1$ tends to be small. Notice that $M_1$ is a measure of spread of the co-occurrence matrix about the diagonal. This measure can be simplified even further as:

$$\max_{i,j} |i-j|$$

for all i,j such that $C_{ij} \neq 0$.

2.1.3 Additional Cell Histogram Based Features

In addition to the graylevel spread feature described earlier in this section, a number of other histogram-based features are useful to describe a cell. These features, based on the cell histogram, are useful in determining the likelihood that a cell resides in a photo region. These features, are determined in a step 524 and are described below.

2.1.3.1 Range

The range is defined as:

max graylevel−min graylevel+1 where the max graylevel and the min graylevel are easily obtained from the histogram. Max graylevel is the highest graylevel of the histogram that has a non-zero element. Conversely, Min graylevel is the lowest graylevel that has a non-zero element.

2.1.3.2 Percent-Dark

The percent dark is defined as:

$$\frac{\text{number of black pixels}}{\text{total number of pixels}} \times 100$$

The number of black pixels can be obtained from the histogram after deciding on a threshold. The threshold can be defined for a bi-level histogram such that every pixel of a graylevel above threshold is black and everything below threshold is white. For a bi-level histogram this threshold can be the valley in between the peaks.

2.1.3.3 Histogram Shape

Figure 17:
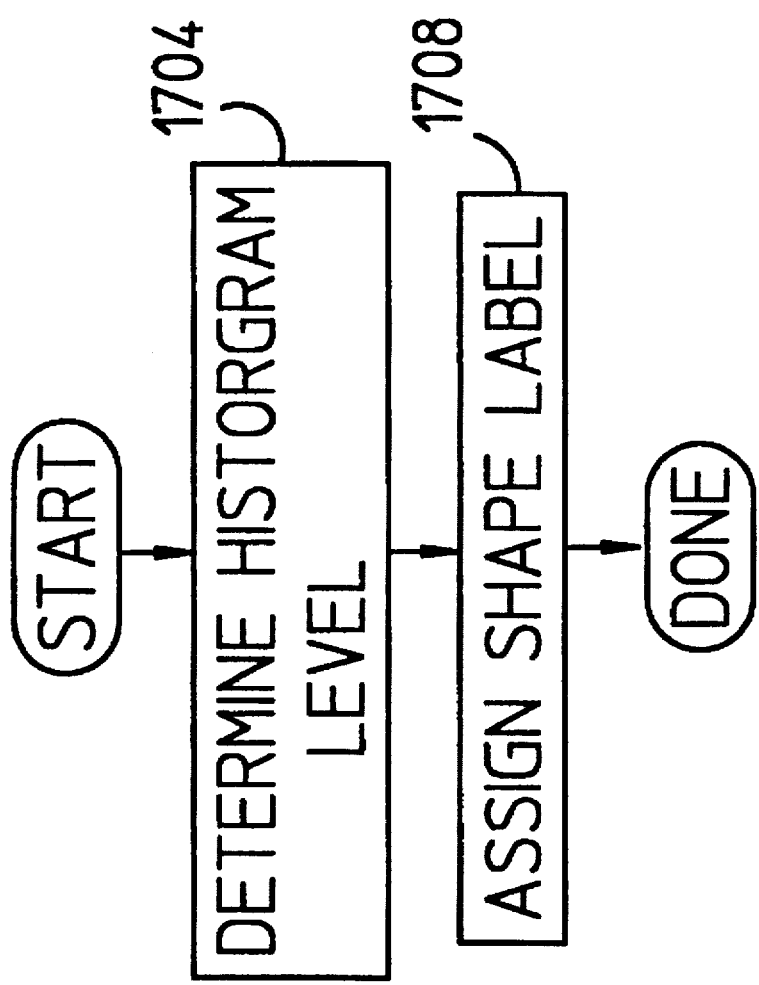
FIG. 17 is a high-level operational flow diagram illustrating the manner in which a shape label of a graylevel histogram is determined.

Histogram shape is a useful feature that can be used to detect the likelihood that a cell resides in a photo region. FIG. 17 is an operational flow diagram illustrating the manner in which the histogram shape feature is extracted. Referring now to FIG. 17, Histograms can be classified as mono-level, bi-level, and tri- (or higher) level. Furthermore, monolevel and bi-level histograms can be classified as weak or strong. Each of these attributes is described separately.

Figure 18:
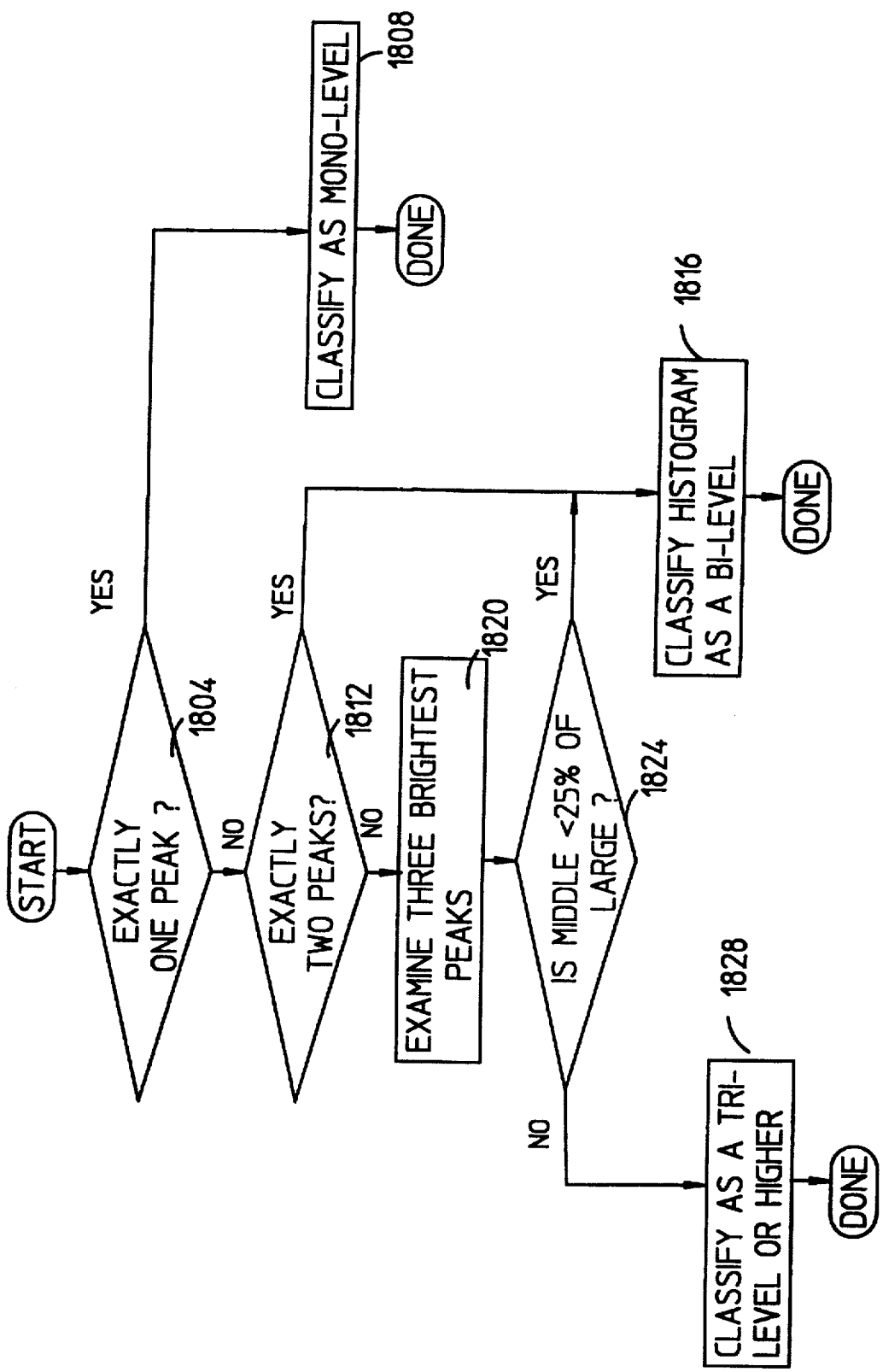
FIG. 18 is an operational flow diagram illustrating the manner in which a graylevel histogram is classified as a mono-level, bi-level, or higher-level histogram.

In a step 1704, the level of the histogram is determined. The manner in which the histogram level is determined is illustrated in the operational flow diagram of FIG. 18. Referring now to FIG. 18, if the histogram has exactly one peak (decision block 1804), the histogram is a monolevel histogram as shown in block 1808.

If exactly two peaks occur (decision block 1812), the histogram is a bi-level histogram as shown in block 1816. The darker peak graylevel is called "dark-peak" and the lighter one is called "bright peak."

If more than two peaks occur (the answer to decision block 1812 is negative), the histogram can be bi-level or higher, depending on the characteristics of the peaks. In this case, the operation continues by determining the number of peaks that are "significant."

In a step 1820, if more than two peaks occur, then the three highest peaks are examined first. Of these three highest peaks, the darkest peak (corresponding to the lowest graylevel) is called dark-peak, the lightest of the three peaks is called bright-peak, and the middle one is called mid-peak. If the height of the middle peak is less than 25% the height of the largest peak (decision block 1824), then the histogram is declared bi-level as shown in step 1816. Otherwise the histogram is declared tri-level or higher-level as shown in step 1828.

Referring again to FIG. 17, in a step 1708, a shape label is assigned to the cell. For a monolevel histogram, if the graylevel spread is equal to or larger than a given minimum value (defined below), the cell is assigned the shape label "MONOLEVEL PHOTO." If the range is smaller than or equal to six the cell is assigned the label "monolevel strong." If the range is larger than six, the shape label is "monolevel weak."

For a bi-level histogram, if its graylevel spread is at least a given minimum value (defined below), the cell is assigned the shape label BILEVEL PHOTO. Otherwise it is assigned one of three labels: STRONG-BILEVEL, MID-STRONG-BILEVEL, or WEAK-BILEVEL. The manner in which this assignment is accomplished described below, in conjunction with the introduction of several important terms.

The term PEAK-DIST is defined as the distance between the bright peak and the dark peak. This can be written as:

$$PEAK\text{-}DIST = BRIGHT\ PEAK - DARK\ PEAK$$

The term DARK-DIST is defined as the distance between the dark peak and the minimum graylevel in the histogram. This can be expressed as:

$$DARK\text{-}DIST = DARK\ PEAK - GRAY\ MIN$$

The term BRIGHT-DIST is defined as the distance between the bright peak and the minimum graylevel in the histogram. This can be expressed as:

$$BRIGHT\text{-}DIST = BRIGHT\ PEAK - GRAY\ MIN$$

The value PEAK-DIST-MIN is a function of the bright peak and can be assigned as illustrated in the following table:

TABLE 2

| BRIGHT-PEAK | 0–8 | 9–10 | 11–12 | 13–15 |
|---|---|---|---|---|
| PEAK-DIST-MIN | 3 | 4 | 5 | 6 |

Finally, H-DARK is the height of the dark peak and H-BRIGHT is the height of the bright peak.

Four conditions are defined below. These conditions are used to label the cell as either a STRONG-BILEVEL, MID-STRONG-BILEVEL, or a WEAK-BILEVEL cell. The four characteristics or conditions are as follows:

(i) PEAK-DIST ≦ PEAK-DIST-MIN; AND
(ii) PEAK-DIST ≦ 2 DARK-DIST
(iii) H DARK < H BRIGHT/25; and
(iv) BRIGHT DIST ≧ PEAK DIST MIN The cell is assigned the shape label STRONG-BILEVEL if conditions (i) and (ii) are satisfied. If conditions (i) and (ii) are not satisfied, then the cell is assigned one of the two shape labels: MID-STRONG-BILEVEL or WEAK-BILEVEL.

The cell is assigned the shape label MID-STRONG-BILEVEL if conditions (iii) and (iv) are met. If these conditions are not met, the cell is assigned the label WEAK-BILEVEL.

Figure 14A:
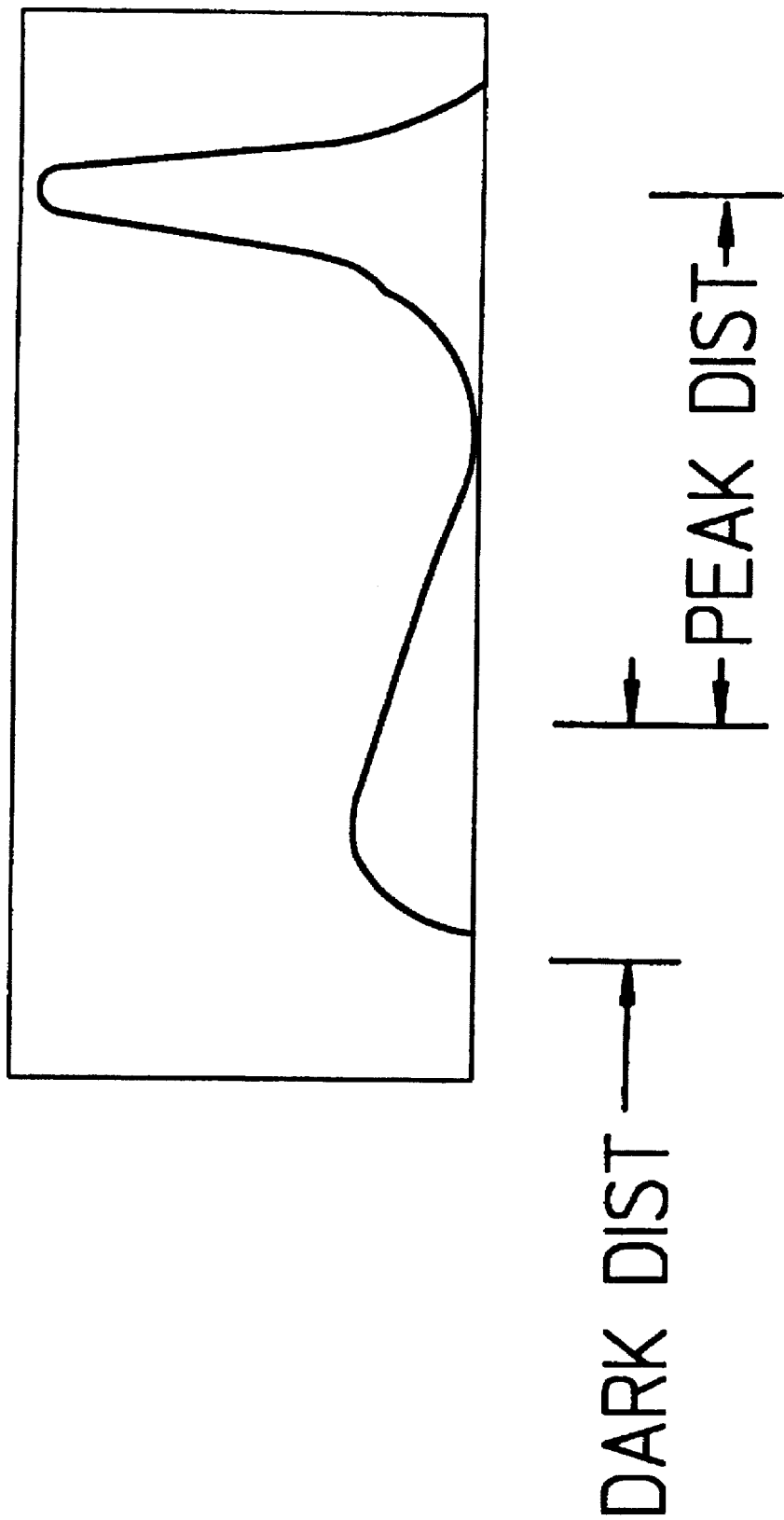
FIG. 14A is a diagram illustrating a strong bi-level histogram shape.

FIGS. 14A and 14B illustrate the difference between a STRONG-BILEVEL histogram shape and a WEAK-BILEVEL shape. FIG. 14A satisfies conditions (i) and (ii) and is therefore assigned the label STRONG-BILEVEL. FIG. 14B does not meet condition (i) and is therefore not a STRONG-BILEVEL. Black on white text and line-art histograms typically resemble the histogram illustrated in FIG. 14A. These histograms are characterized by a narrow spread of the dark peak away from the bright peak (i.e., a small dark distance 1402) separated from the bright peak by a relatively large peak distance 1404. The wider spread of the dark peak toward the bright peak is expected because this represents the transitions from dark to mid to bright graylevels.

Condition (iii) for MID-STRONG BI-LEVELS is useful in cases where there are few dark levels in the cell as compared to the number of bright levels. In other words, there are small fonts with thin strokes.

Any cell which is not declared mono-level or bi-level is declared a tri-level or higher-level shaped histogram. If the cell has a gray level spread of at least a value, the cell is assigned the shape label TRI-LEVEL PHOTO. Otherwise, it is assigned the label TRI-LEVEL.

2.1.4 Other Features

Both the histogram graylevel spread measure and the co-occurrence matrix moment of inertia give information about the statistical nature of the graylevels in a cell. However, they do not give much information pertaining to the structural, geometrical, or positional nature of the features of the cell. Features based on row and column profiles of the cell provide such information. These features can also be calculated in addition to, the graylevel spread feature. These features are Calculated in a step 520.

The row profile R of an N×N cell G is defined as an N×1 vector such that $$R_i = \sum_j G_{ij}$$

where $G_{ij}$ is the grayvalue of the (i,j)th pixel in the cell. The column profile is an 1×N vector such that $$C_j = \sum_i G_{ij}$$

The row and column profiles are thus one-dimensional profiles of the two-dimensional information in the cell. These profiles give clues as to the presence or absence of geometrical features such as horizontal or vertical rules (lines), rows of text, etc. These profiles can also be used to detect the beginning or ending of a horizontal or vertical photo boundary within a cell.

For a 64×64 cell, the profile vectors are 64×1 and 1×64. To further reduce the amount of data and to achieve noise reduction, these vectors are reduced to 32×1 and 1×32 by adding every two consecutive elements from the original profiles to create a single element in the reduced profiles. Further simplification is achieved by replacing the profile values with only the most significant byte.

Figure 13:
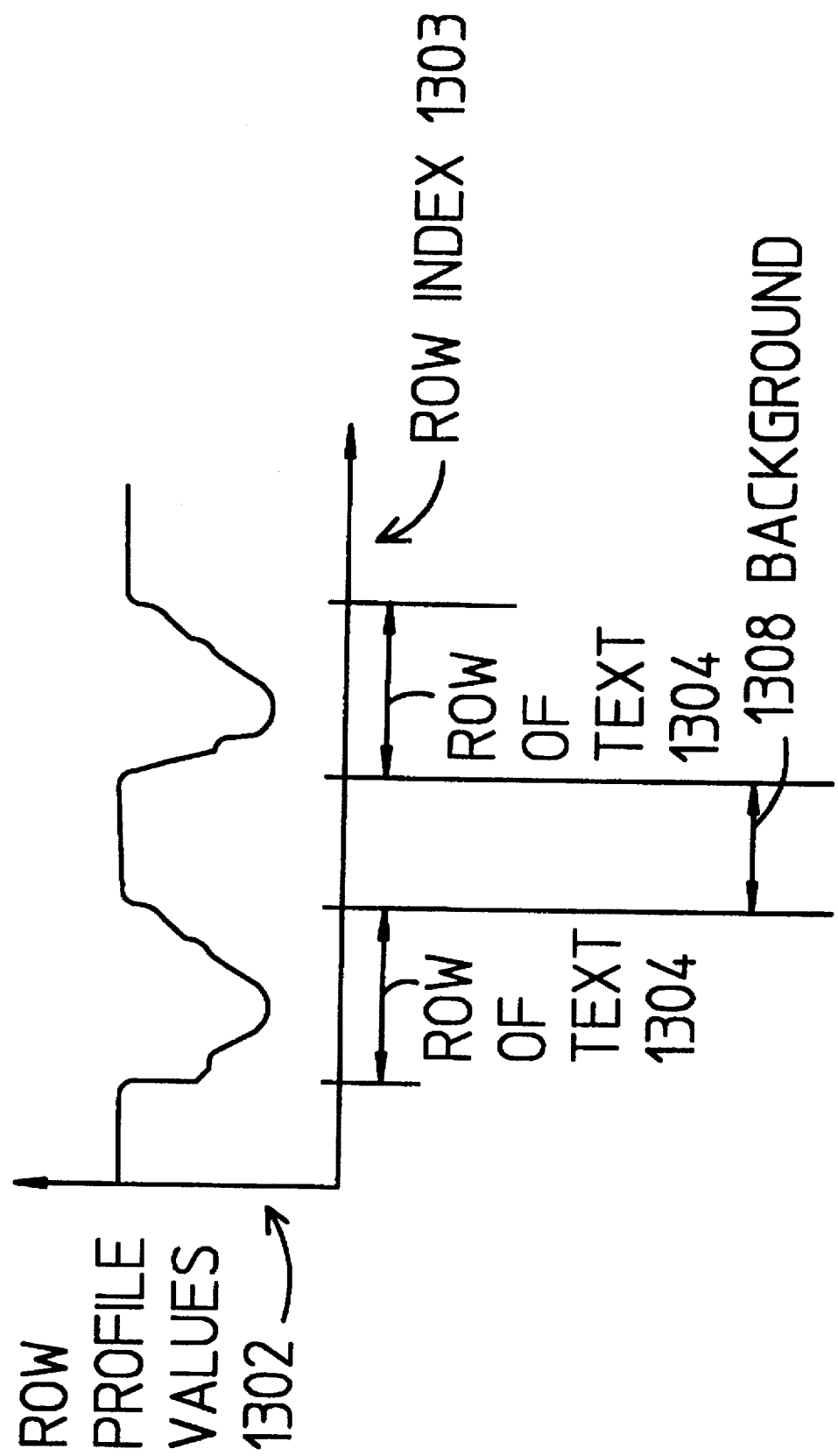
FIG. 13 is a diagram illustrating the manner in which row profile values can be used to indicate rows of text and background.

To illustrate the use of these profiles, consider, for example, a way to determine whether it is likely that information in a region corresponds to text. FIG. 13 illustrates how the data in the row profile might look when plotted. Row profile values 1302 are plotted along the ordinate and a row index 1303 along the abscissa. For a black text on white page, low row profile values 1302 indicate a row of text 1304, while high row profile values 1302 indicate background 1308.

A way to further verify the likelihood that this information is text is to compare the row profile of the current cell with the row profile of its neighbors to the left and to the right. In most cases the boundaries between the rows of text and background for the cells should align approximately. A computationally simple way of accomplishing this is to choose the threshold as:

$$\text{threshold} = \max_{i} \{R_i\} = 16$$

assuming the $R_i$'s are 8-bit values. By examining the cells above and below the current cell, the width and spacing of the rows of text over a given area can be determined.

3.0 Determination of Highly Likely Photoregions

The second step, step 108, in the photodetection system is determining which cells are very likely to be part of a photo region and which cells are likely to be part of a non-photo region. Once the likelihood is determined, the cells are classified, or labeled, as photo cells, non-photo cells, or unclassified cells in a step 110. The classification is made based on the likelihood. The cells classified as photo cells or non-photo cells are used as "seeds" in step 112 to start the region growing process.

3.1 Highly Likely Photo Cells

Cells whose graylevel spread is at least a specified minimum are designated as highly likely photo cells. The specified minimum is a function of the graylevel of the peak considered to be the "background" peak and also a function of whether the histogram is monolevel.

If the histogram is monolevel, then the given graylevel spread minimum is a function of the background peak. In the case of a monolevel histogram, the background peak is the only peak. The graylevel spread for the monolevel histogram according to a preferred embodiment is listed in Table 3:

TABLE 3

| background peak | 0–4 | 5–11 | 12–14 | 15 |
|---|---|---|---|---|
| graylevel spread min | 2 | 3 | 4 | 3 |

Thus, for example, if a monolevel cell has a background peak at a graylevel of 4, it is a highly likely photo region if it has a graylevel spread (determined in step 108 and described above) of greater than or equal to 2.

If the histogram is bilevel or higher, then, in one embodiment, the background peak is either the bright peak or the dark peak. If the height of the dark peak is larger than three times the height of the bright peak, then the background peak is considered to be the dark peak. Otherwise the background peak is the bright peak. Table 4 illustrates how the graylevel spread minimum is specified for various background peak graylevels in multiple-level histograms according to a preferred embodiment.

TABLE 4

| background peak | 0–4 | 5–11 | 12–15 |
|---|---|---|---|
| graylevel spread min | 3 | 4 | 4 |

Thus, for example, if a bi-level cell has a background peak at a graylevel of 4, it is a highly likely photo region if it has a graylevel spread (determined in step 108 and described above) of greater than or equal to 3.

3.2 Highly Likely Non-Photo Cells

Three types of highly likely non-photo cells are used as seeds: background seeds, bilevel seeds, and text seeds. Each of these seeds is now described in sections 3.2.1, 3.2.2, and 3.2.3, respectively.

3.2.1 Background Seeds

Figure 15:
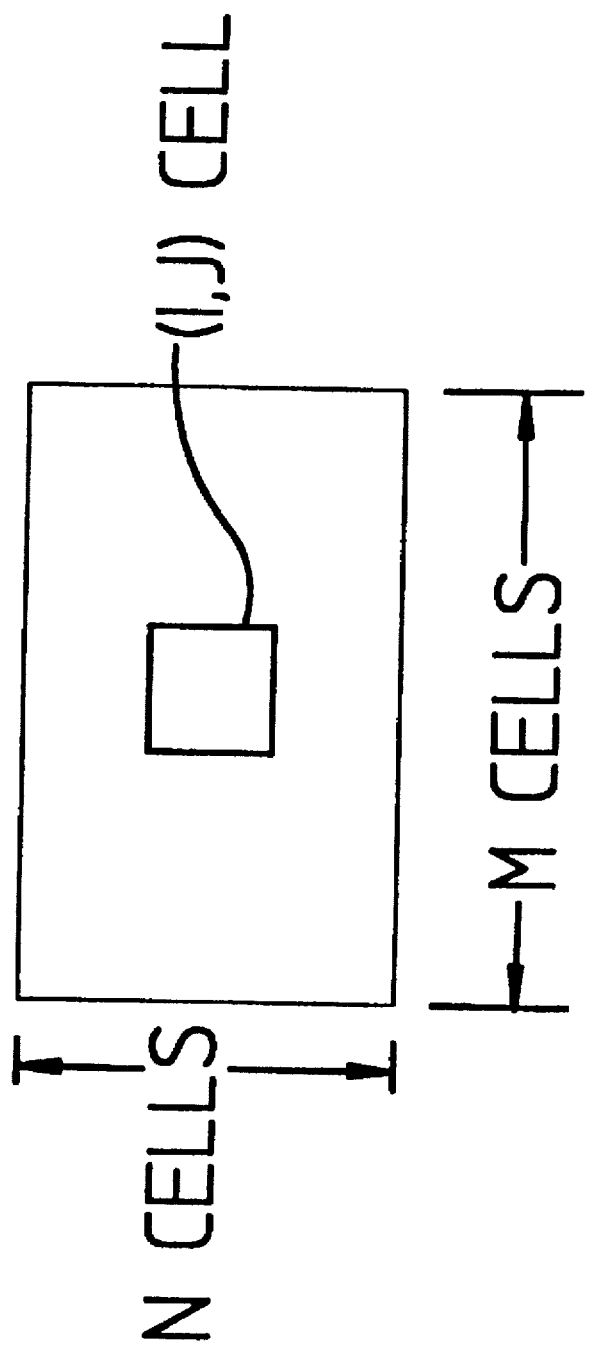
FIG. 15 is a diagram illustrating a background seed.

Background seeds are useful and necessary to start the region growing process at the top of a page where typically there is an area (page margin) of homogeneous background. FIG. 15 is a diagram illustrating a region of cells used to determine if one cell is a background seed. Referring now to FIG. 15, A region 1508 comprises a plurality of cells 1504. The region is an n×m region and cells 1504 can be identified by the coordinates (i,j). In a preferred embodiment, the region size is 1 cell×4 cells.

A particular (i,j) cell is a background seed if two conditions are satisfied:

(i) (i,j) and all its neighbor cells 1504 inside rectangular region 1508 have the shape label "monolevel strong"; and (ii) The maximum difference between the peak graylevels between any two cells in the rectangular region is 1.

3.3 Bilevel Seeds

Bilevel seeds are used to start region growing for text or line art anywhere on the page. Referring again to FIG. 15, a cell (i,j.) 1504 in a rectangular region of n×m cells. The (i,j) cell 1504 in question is a bilevel seed if the following conditions are satisfied:

(i) (i,j) and all its neighbors (i.e. its "immediately adjacent cells") inside the rectangular region have shape label "BILEVEL STRONG," "BI-LEVEL MID-STRONG," or "MONOLEVEL STRONG";

(ii) There are at least n×m/4 "BILEVEL STRONG" cells;

(iii) The percent-dark feature for the rectangular region as a whole is less than 30%; and (iv) The maximum difference between the peak graylevels between any two cells in the rectangular region is 1.

In a preferred embodiment, the region size is 3 cells×4 cells.

3.3 Text Seeds

Text seeds are used to resolve certain ambiguous situations that occur when a cell that is in close proximity to a classified photo area satisfies the condition for a bilevel seed, but it is actually part of the photo area. In this case an additional test is performed. This test is made to determine whether the cell satisfies the conditions for a text seed. If the test is true, the cell is used as a seed to grow a bilevel region. On the other hand, if the cell is not a text seed, then it is not used as a seed to grow a bilevel region. The conditions necessary to classify the cell as a text seed are the same as those conditions discussed in the above discussion of the row and columns profile features.

4.0 Region Growing

The final step, step 112, is to grow regions based on the features extracted from the cells. The basic strategy is to grow non-photo regions first and then to grow photo regions. Photo regions are grown starting with the highly likely photo cells, and growing them into any cell that has been left unclassified.

4.1 Non-photo Region Growing

Non-photo regions are grown from highly likely non-photo cells. The regions are grown by locating a highly-likely non-photo cell and combining it with neighboring cells with "similar" characteristics (i.e. with similar features). The growth process takes place horizontally and vertically. Horizontal growth can take place left to right and right to left. In a preferred embodiment, vertical growth takes place top-down (in the direction of the scan).

4.1.1 Horizonal Left-to-Right

Figure 16:
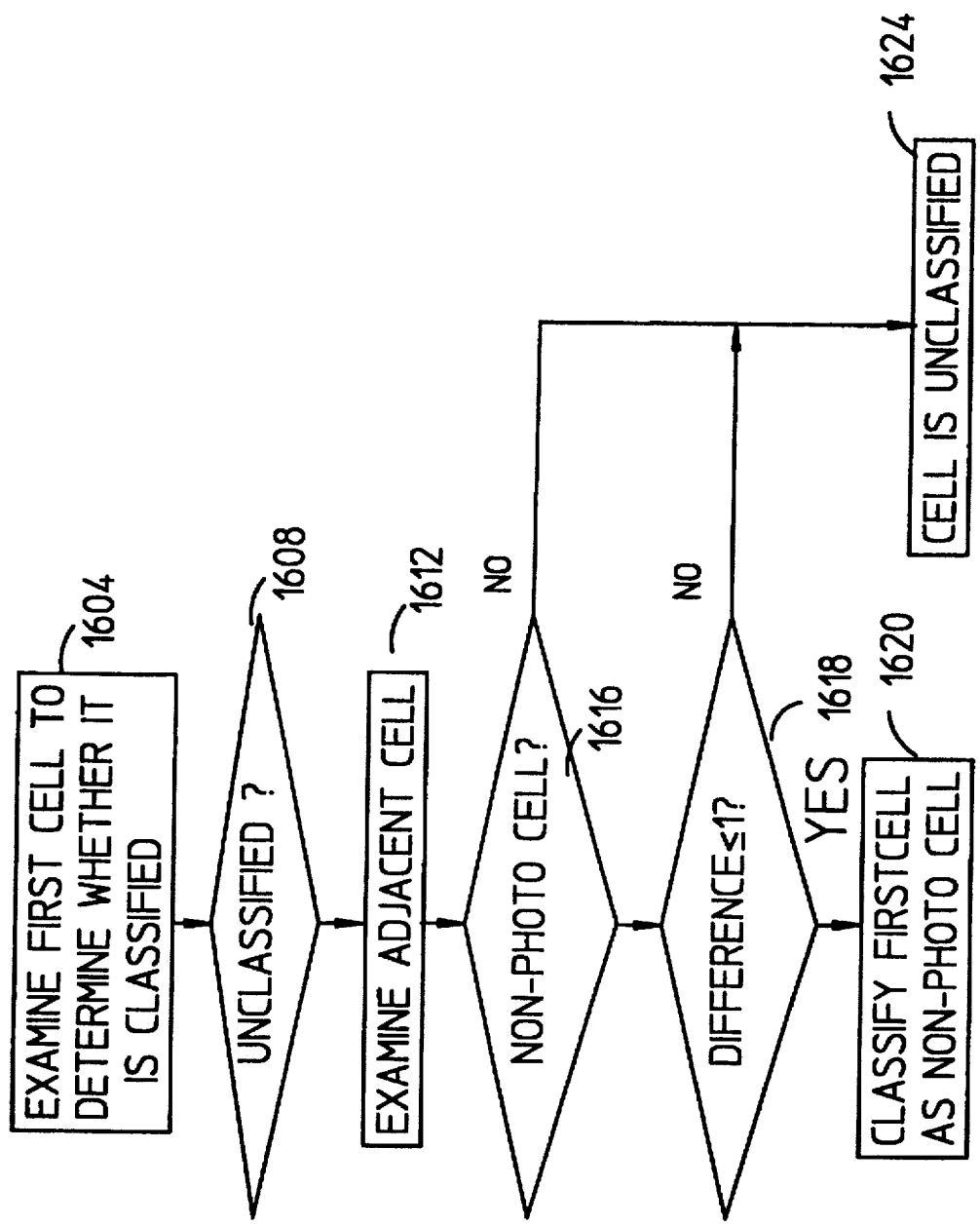
FIG. 16 is an operational flow diagram illustrating the manner in which non-photo regions are grown.

The manner in which cells are classified in a left-to-right scan is now described. FIG. 16 is an operational flow diagram illustrating the process of classification using left-to-right scanning. Referring now to FIG. 16, in a step 1604, a first cell is examined to determine whether it is classified. If the cell is unclassified (decision block 1608), the cell immediately to its left is examined in a step 1612. If this cell is classified as a non-photo cell (decision block 1616), and the difference between the bright peaks of both cells is no larger than 1 (decision block 1618), then the cell is classified as non-photo cell in a step 1620. If either of these last two conditions fails, the cell is unclassified as shown by block 1624. It should be noted that at the beginning of the region growing process, the only classified cells are the highly likely photo and non-photo cells.

4.1.2 Horizontal Right-to-Left

The manner in which cells are classified in a right-to-left scan is the same as discussed above for a left-to-right scan, except, the cells are scanned right to left, and the right neighbor is examined in step 1612 instead of the left neighbor.

4.1.3 Vertical Top-Down

The manner in which cells are classified in a top down scan is the same as discussed above for a left-to-right scan, except, the cells are scanned top to bottom, and the top neighbor is examined in step 1612 instead of the left neighbor.

4.1.4 Boundary Guided Region Growing

As photo regions are formed, their boundaries within cells can be accurately placed by using the row and column profile features described earlier. Horizontal boundaries are found using the row profile of a cell. Vertical boundaries are found using the column profile of a cell. The vertical boundaries of photo cells classified in the previously already processed row of cells in the image can be used to guide or constrain horizontal left-to-right and horizontal right-to-left non-photo region growing. This takes place as follows. If the cell immediately above the current cell being examined for growing is a photo cell with a west border passing through it, then we examine the column profile of the current cell looking for evidence of a vertical border or edge that aligns with the west border in the cell above. If this is the case, then left-to-right non-photo growing will be prevented for the current cell. Similarly east borders on the cells above can be used to prevent right-to-left non-photo growing in the current cell.

5.0 Representative Architecture

Figure 19:
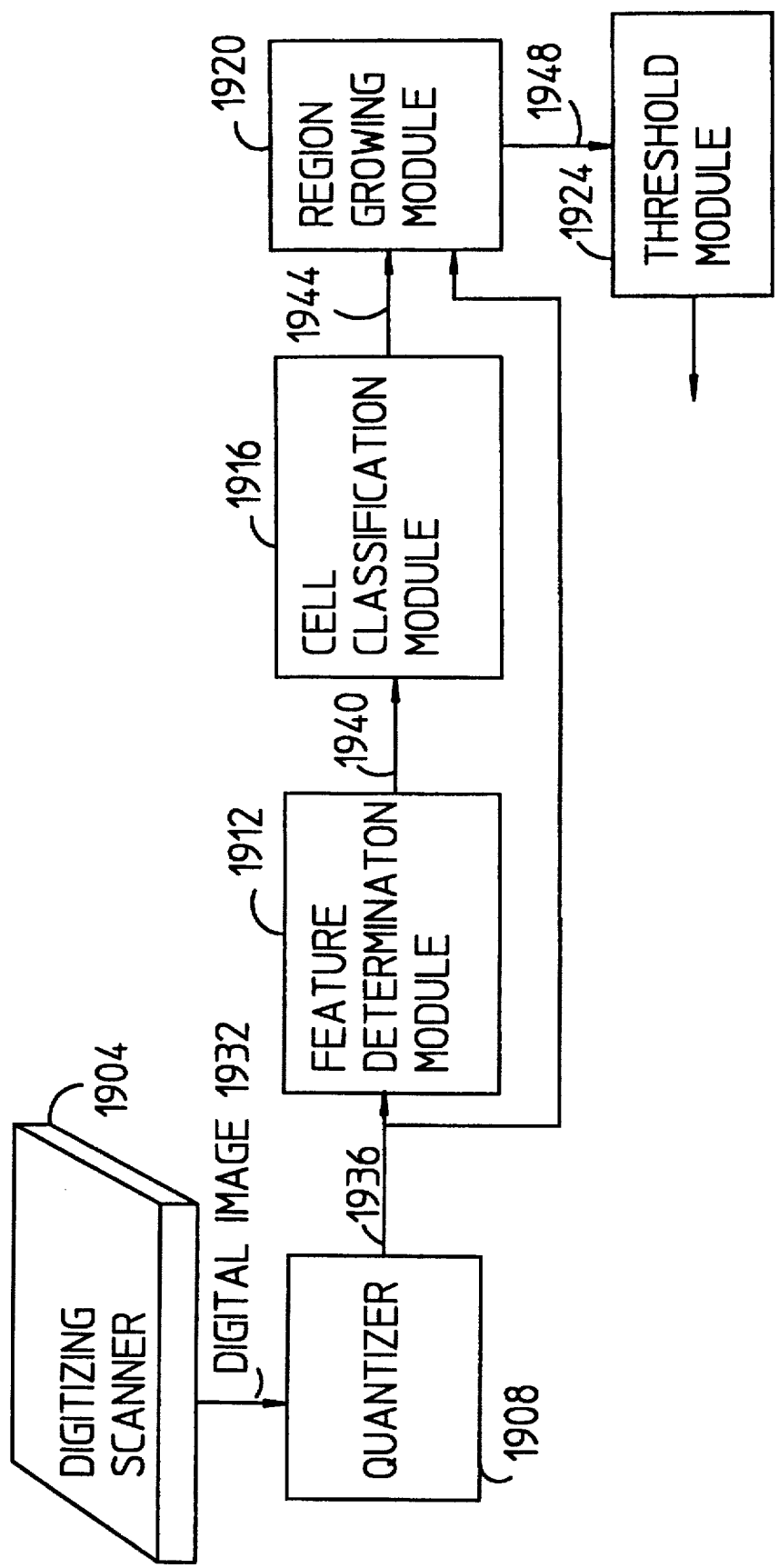
FIG. 19 is a block diagram illustrating a representative architecture of a system for detecting photo regions in digital images.

A representative architecture Of a system for detecting photo regions in a digital image is now presented and described. The architecture is presented in terms of an example of how the invention is implemented to increase the efficiency of digitally representing an image. According to this example, the digital image is created by scanning a page of a document using a digitizing scanner such as the Hewlett Packard Company's SCANJET™ Scanner. FIG. 19 is a block diagram illustrating the invention interfaced to a digitizing scanner.

Referring now to FIG. 19, a digitizing scanner 1904 is used to scan a page to convert the text and/or graphical material on the page to a digital image 1932. The digital image 1932 comprises an array of pixels to represent the page. Each pixel uses a number of bits to represent a color or graylevel for the pixel. In this example digital image 1932 is in an 8-bit-per-pixel format.

An optional quantizer 1908 performs a quantization to convert the format of digital image 1932. For example, in one embodiment, quantizer 1908 converts digital image 1932 from an 8-bit-per-pixel format to a quantized digital image 1936 having a 4-bit-per-pixel format This quantization is performed as illustrated above in Table 1.

In a preferred embodiment, digital image 1932 is provided to quantizer 1908 in a serial fashion as the document is scanned. In this embodiment, quantizer 1908 receives digital image 1932 as each cell is scanned.

Quantized digital image 1936 is input to a feature determination module 1912. Feature determination module 1912 is used to determine one or more features 1940 of the cells of digital image 1936 as described in Section 2 of this document. Feature determination module 1912 provides the capability to create a graylevel histogram and a co-occurrence matrix 200 if required for feature determination.

Features 1940 for each cell are provided to a cell classification module 1916. Cell classification module 1916 determines the likelihood of a cell being a photo cell or a non photo cell and provides this likelihood information 1944 to a region growing module 1920.

Region growing module 1920 is used to grow regions as photo regions or non-photo regions. Region growing module 1920 receives cells of quantized digital image 1936. If a received cell is unclassified, region growing module, following the procedures set forth in Section 4 of this document, examines neighboring cells to grow a classified region.

To take advantage of the classification, classified regions 1948 are sent to a threshold module 1924. Threshold module 1924 determines a threshold for the non-photo regions and converts the multiple bit-per-pixel representation of those areas to a single-bit-per-pixel format. For example, threshold module 1924 may determine that any pixel with a graylevel of 11 or greater is white and any pixel with a graylevel of less than 11 is black. Threshold module 1924 outputs an optimized digital image 1952 that uses a multiple-bit-per-pixel format for photo regions and a single-bit-per-pixel format for non-photo regions.

6.0 Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for classifying a region in a digital image as either a photo region or a non-photo region, wherein each region comprises a plurality of cells, the method comprising the steps of:

(a) extracting one or more features about each of said plurality of cells, wherein said one or more features indicate a likelihood that said cell is a photo cell, including the step of:

(1) determining a moment of inertia about a main diagonal of a co-occurrence matrix of said cell, including the steps of:

(1) constructing a co-occurrence matrix for each of said cells, said co-occurrence matrix having elements representing a number of times a pixel having a first graylevel is adjacent to a pixel having a second graylevel, and (2) determining a moment of inertia of said co-occurrence matrix, said moment of inertia indicating an amount of graylevel transitions;

(b) determining whether each of said cells is likely to be a photo cell based on said one or more features extracted in step (a);

(c) labeling each of said cells as either a photo cell or a non-photo cell, or an unclassified cell, said classification based on the result of said step (b); and (d) growing region as either photo regions or non-photo regions using said cells.

2. The method of claim 1, further comprising the step of:

(e) after said steps (a) through (d), assigning a number of bits per pixel to each region based on the classification of each region.

3. The method of claim 2, further comprising a step of:

(f) after said step (e), determining a threshold level for each said non-photo region; and (g) after said step (f), converting each said non-photo region to a one-bit-per-pixel format.

4. The method of claim 1, wherein each pixel is represented by one of a plurality of graylevels and wherein said step (a) of feature extraction further comprises the step of:

(ii) constructing a graylevel histogram indicating the number of pixels in each of said plurality of cells that are in each graylevel.

5. The method of claim 4, wherein said step (a) of feature extraction further comprises the step of:

(iii) before said step (a)(ii), quantizing the digital image to convert the number of bits used to represent each pixel.

6. The method of claim 5, wherein said quantizing step (a)(iii) is performed using non-uniform quantization to match human eye response.

7. The method of claim 4, wherein said one or more features extracted during said step (a) of feature extraction is a graylevel spread for said cell, and further wherein said step (a) of determining a graylevel spread for said cell further comprises the step of:

(iii) determining a graylevel spread for each of said plurality of cells, including the steps of:

(1) determining which graylevels of said graylevel histogram represent peaks, and which graylevels represent valleys;

(2) determining a subpopulation for each peak of said graylevel histogram;

(3) determining a probability of each subpopulation;

(4) determining a spread of each subpopulation;

(5) determining a separation indication of each subpopulation; and (6) determining said graylevel spread of said graylevel histogram using said probability of each subpopulation, said spread of each subpopulation, and said separation indication of each subpopulation.

8. The method of claim 7, wherein said graylevel histogram comprises M elements defined by histo[K], K=0, ..., M, and said step (a)(iii)(1) of determining said peaks comprises the step of:

a) determining whether:

$$histo[K-1] < histo[K] > histo[K+1];$$

and $$2histo[K] - histo[K-1] - histo[K+1] > histo[K]/10.$$

9. The method of claim 7, wherein said graylevel histogram comprises M elements defined by histo[K], K=0, ..., M, and said step (a)(iii)(1) of determining said peaks comprises the step of:

a) determining whether:

$$histo[K-1] < histo[K] > histo[K+2];$$

where $$histo[K] = histo[K+1];$$

and $$2histo[k] - histo[K-1] - histo[K+1] > histo[K]/10.$$

10. The method of claim 7, wherein said graylevel histogram comprises M elements defined by histo[K], K=0, ..., M, said peaks at a graylevel K are defined by peak[K], and two valleys adjacent to peak[K] are defined by val[K] and val[K+1], wherein said step (a)(iii)(3) for determining a probability of each subpopulation is given by:

$$p(K) = \frac{0.5\ histo[val[K]] + \sum_{i=val[K]+1}^{val[K+1]-1} histo[i] + 0.5\ histo[val[K+1]]}{\sum_{K=0}^{15} histo[i]}.$$

11. The method of claim 4, wherein said step (d) for growing regions as either non-photo regions or photo regions comprises the steps of:

(i) growing non-photo regions:

(ii) after said step (d)(i) for growing non-photo regions, classifying all other regions as photo regions.

12. The method of claim 1, wherein for each of said cells labelled as non-photo cells, said step (d)(i) for growing non-photo regions comprises the steps of:

(1) determining whether the difference between the graylevel of a bright peak of said graylevel histogram of said non-photo cell and the graylevel of a bright peak of said graylevel histogram of a neighboring unclassified cell is larger than one graylevel; and (2) classifying said neighboring cell as a non-photo cell when said difference is not larger than one graylevel;

(3) classifying a combination of said non-photo cell and said neighboring cell as a non-photo region.

13. A method for classifying a region in a digital image as either a photo region or a non-photo region, wherein each region comprises a plurality of cells, each of said plurality of cells comprising pixels, each of said pixels represented by one of a plurality of graylevels, the method comprising the steps of:

(a) extracting one or more features about each of said plurality of cells, wherein said one or more features indicate a likelihood that said cell is a photo cell, and further wherein said one or more features include a graylevel spread for said cell, including the step of:

(i) constructing a graylevel histogram indicating the number of pixels in each of said plurality of cells that are in each graylevel, and (ii) determining a graylevel spread for each of said plurality of cells, including the steps of:

(1) determining which graylevels of said graylevel histogram represent peak, and which graylevels represent valleys, (2) determining a subpopulation for each peak of said graylevel histogram, (3) determining a probability of each subpopulation, (4) determining a spread of each population, (5) determining a separation indication of each subpopulation, and (6) determining said graylevel spread of said graylevel histogram using said probability of each subpopulation, said spread of each subpopulation, and said separation indication of each subpopulation;

(b) determining whether each of said cells is likely to be a photo cell based on said one or more features extracted in step (a);

(c) labeling each of said cells as either a photo cell, a non-photo cell, or an unclassified cell, said classification based on the result of step (b); and (d) growing regions as either photo regions or non-photo regions using said cells.

14. The method of claim 13, wherein said step (a) of feature extraction further comprises the step of:

(iii) before said step (a)(ii), quantizing the digital image to convert the number of bits used to represent each pixel using non-uniform quantization to match human eye response.

15. The method of claim 13, wherein said graylevel histogram comprises M elements defined by histo[K], K=0, ..., M, and said step (a)(ii)(1) of determining said peaks comprises the step of:

a) determining whether:

$$histo[K-1] < histo[K] > histo[K+1];$$

and $$2histo[K] - histo[K-1] - histo[K+1] > histo[K]/10.$$

16. The method of claim 13, wherein said graylevel histogram comprises M elements defined by histo[K], K=0, ..., M, and said step (a)(ii)(1) of determining said peaks comprises the step of:

a) determining whether:

$$histo[K-1] < histo[K] > histo[K+2];$$

where $$histo[K] = histo[K+1];$$

and $$2histo[k] - histo[K-1] - histo[K+1] > histo[K]/10.$$

17. The method of claim 13, wherein said graylevel histogram comprises M elements defined by histo[K], K=0, ..., M, said peaks at a graylevel K are defined by peak[K], and two valleys adjacent to peak[K] are defined by val[K] and val[K+1], wherein said step (a)(ii)(3) for determining a probability of each subpopulation is given by:

$$p(K) = \frac{0.5\ histo[val[K]] + \sum_{i=val[K]+1}^{val[K+1]-1} histo[i] + 0.5\ histo[val[K+1]]}{\sum_{K=0}^{15} histo[i]}.$$

18. The method of claim 13, wherein said step (d) for growing regions as either non-photo regions or photo regions comprises the steps of:

(i) growing non-photo regions; and (ii) after said step (d)(i) for growing non-photo regions, classifying all other regions as photo regions.

19. The method of claim 18, wherein for each of said cells labelled as non-photo cells, said step (d)(i) for growing non-photo regions comprises the steps of:

(1) determining whether the difference between the graylevel of a bright peak of said graylevel histogram of said non-photo cell and the graylevel of a bright peak of said graylevel histogram of a neighboring unclassified cell is larger than one graylevel;

(2) classifying said neighboring cell as a non-photo cell when said difference is not larger than one graylevel; and (3) classifying a combination of said non-photo cell and said neighboring cell as a non-photo region.

* * * * *

UNITED STATES PATENT AND TRADEMARK OFFICE
CERTIFICATE OF CORRECTION

PATENT NO. : 5,546,474
DATED : 08/13/96
INVENTOR(S) : Oscar A. Zuniga

It is certified that error appears in the above-identified patent and that said Letters Patent is hereby corrected as shown below:

Column 7, line 9, "0=K>15" should read --($0 \leq K \leq 15$);

Column 13, line 49, "(i) PEAK-DIST $\leq$ PEAK-DIST-MIN; AND" should read -- (i) PEAK-DIST $\geq$ PEAK-DIST-MIN; AND--;

Column 13, line 50, "(ii) PEAK-DIST $\leq$ 2 DARK-DIST" should read -- (ii) PEAK-DIST $\geq$ 2 DARK-DIST --.

Signed and Sealed this

Twenty-second Day of December, 1998

Attest:

BRUCE LEHMAN

*Attesting Officer*  *Commissioner of Patents and Trademarks*